US012731132B2

(12) United States Patent
Kumagai

(10) Patent No.: US 12,731,132 B2
(45) Date of Patent: Sep. 8, 2026

(54) PRODUCT APPRAISAL AND AUTHENTICATION SYSTEM AND METHOD

(71) Applicant: cycaltrust Co., Ltd., Tokyo (JP)

(72) Inventor: Emi Kumagai, Tokyo (JP)

(73) Assignee: cycaltrust Co., Ltd., Tokyo (JP)

( * ) Notice: Subject to any disclaimer, the term of this patent is extended or adjusted under 35 U.S.C. 154(b) by 69 days.

(21) Appl. No.: 18/565,778

(22) PCT Filed: Oct. 27, 2022

(86) PCT No.: PCT/JP2022/040241
§ 371 (c)(1),
(2) Date: Nov. 30, 2023

(87) PCT Pub. No.: WO2023/085115
PCT Pub. Date: May 19, 2023

(65) Prior Publication Data
US 2024/0370853 A1 Nov. 7, 2024

(30) Foreign Application Priority Data
Nov. 12, 2021 (JP) ................................ 2021-185284

(51) Int. Cl.
*G06Q 20/36* (2012.01)
*G06Q 30/02* (2023.01)

(52) U.S. Cl.
CPC ..... *G06Q 20/3674* (2013.01); *G06Q 30/0278* (2013.01)

(58) Field of Classification Search
None
See application file for complete search history.

(56) References Cited

U.S. PATENT DOCUMENTS 11,367,039 B2 * 6/2022 Toohey ................ G06Q 10/083
2015/0269570 A1 9/2015 Phan et al.
2021/0248653 A1 8/2021 McKenzie et al.
2021/0264444 A1 * 8/2021 Chen ....................... G06T 11/00
(Continued)

FOREIGN PATENT DOCUMENTS

CA 3 155 654 4/2021
JP 2001-357377 12/2001
(Continued)

OTHER PUBLICATIONS

International Search Report issued Jan. 17, 2023 in International Application No. PCT/JP2022/040241.
(Continued)

*Primary Examiner* — Jamie R Kucab
(74) *Attorney, Agent, or Firm* — Wenderoth, Lind & Ponack, L.L.P.

(57) ABSTRACT

A hashed identifier individually assigned to an appraisal required product based on digital goods data of the appraisal required product (5) is generated, a transaction hash or a two-dimensional code corresponding thereto generated when a non-fungible token (NFT) of the appraisal required product (5) associated with the generated identifier is recorded on a blockchain is output, and a first blockchain wallet address of an owner of the NFT of the appraisal required product (5) at a transfer destination is recorded in association with the NFT every time the owner changes.

3 Claims, 12 Drawing Sheets

(56) References Cited

U.S. PATENT DOCUMENTS

| | | | | |
|---|---|---|---|---|
| 2021/0406920 | A1* | 12/2021 | McLaney | G06Q 20/38215 |
| 2022/0284447 | A1* | 9/2022 | Bulawski | G06K 19/07758 |

FOREIGN PATENT DOCUMENTS

| | | |
|---|---|---|
| JP | 2018-173812 | 11/2018 |
| JP | 2020-35197 | 3/2020 |
| JP | 2020-68388 | 4/2020 |
| JP | 2020-170360 | 10/2020 |
| JP | 6829927 | 2/2021 |
| JP | 6894033 | 6/2021 |
| WO | 2014/207890 | 12/2014 |
| WO | 2020/080537 | 4/2020 |
| WO | 2020/118297 | 6/2020 |

OTHER PUBLICATIONS

Extended European Search Report and Search Opinion issued Mar. 17, 2025 in corresponding European Patent Application No. 22892614.3, 10 pages.

* cited by examiner

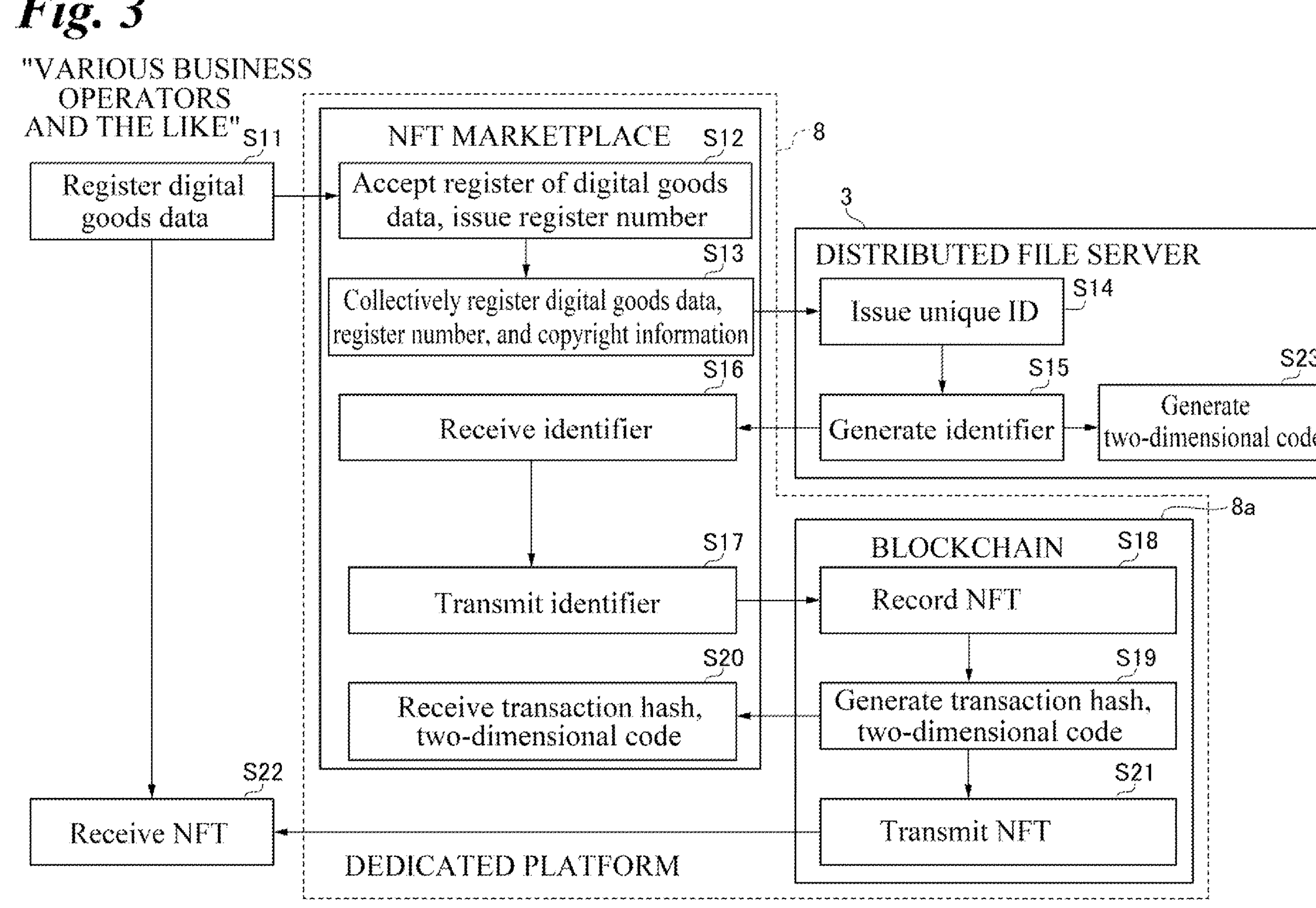
Fig. 3
"VARIOUS BUSINESS OPERATORS AND THE LIKE"
S11
Register digital goods data
NFT MARKETPLACE
S12
Accept register of digital goods data, issue register number
S13
Collectively register digital goods data, register number, and copyright information
S16
Receive identifier
S17
Transmit identifier
S20
Receive transaction hash, two-dimensional code
8
3
DISTRIBUTED FILE SERVER
S14
Issue unique ID
S15
Generate identifier
S23
Generate two-dimensional code
8a
BLOCKCHAIN
S18
Record NFT
S19
Generate transaction hash, two-dimensional code
S21
Transmit NFT
S22
Receive NFT
DEDICATED PLATFORM

*Fig. 6*

<PERSON IN CHARGE OF MANUFACTURE IN MANUFACTURING COMPANY>

Using application [A],
following product information is
written to blockchain data of dedicated platform

| | |
|---|---|
| Brand name | : Bag |
| Product number | : XXYYZZ0011 |
| Manufacturing company | : xx |
| Manufacturing place | : Italy |
| Date of manufacture | : January 1, 2020 |

<PERSON RESPONSIBLE FOR MANUFACTURE IN MANUFACTURING COMPANY>

Using application [A],
inspection result of product information recorded by
<person responsible for manufacture in manufacturing company> is
written to blockchain data of dedicated platform

<LOGISTICS PROVIDER>

Using application [A],
date and time of receiving product from manufacturing company and
date and time of delivery to wholesaler are
written to blockchain data of dedicated platform

<WHOLESALER>

Using application [A],
date and time of delivery of product from logistics provider and
date and time of transferring to retailer by logistics provider are
written to blockchain data of dedicated platform

. . . . . . . .

. . . . . . . .

<USER>

Using secret key $\alpha_1$ and secret key $\beta_1$, and
using application [B],
product information and transaction information are
read from blockchain data of dedicated platform

*Fig. 7A*
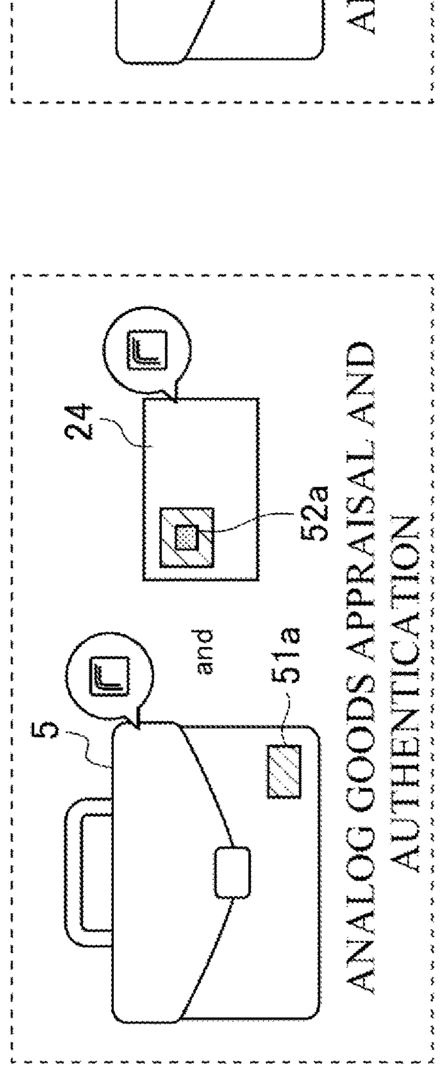
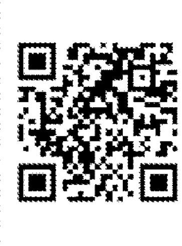
*Fig. 7B*
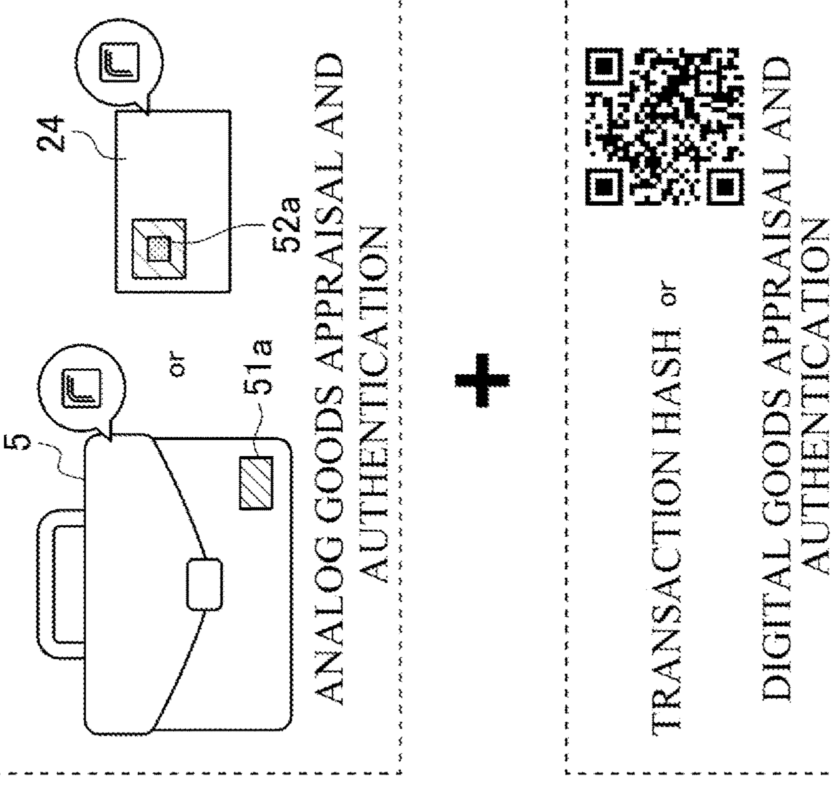

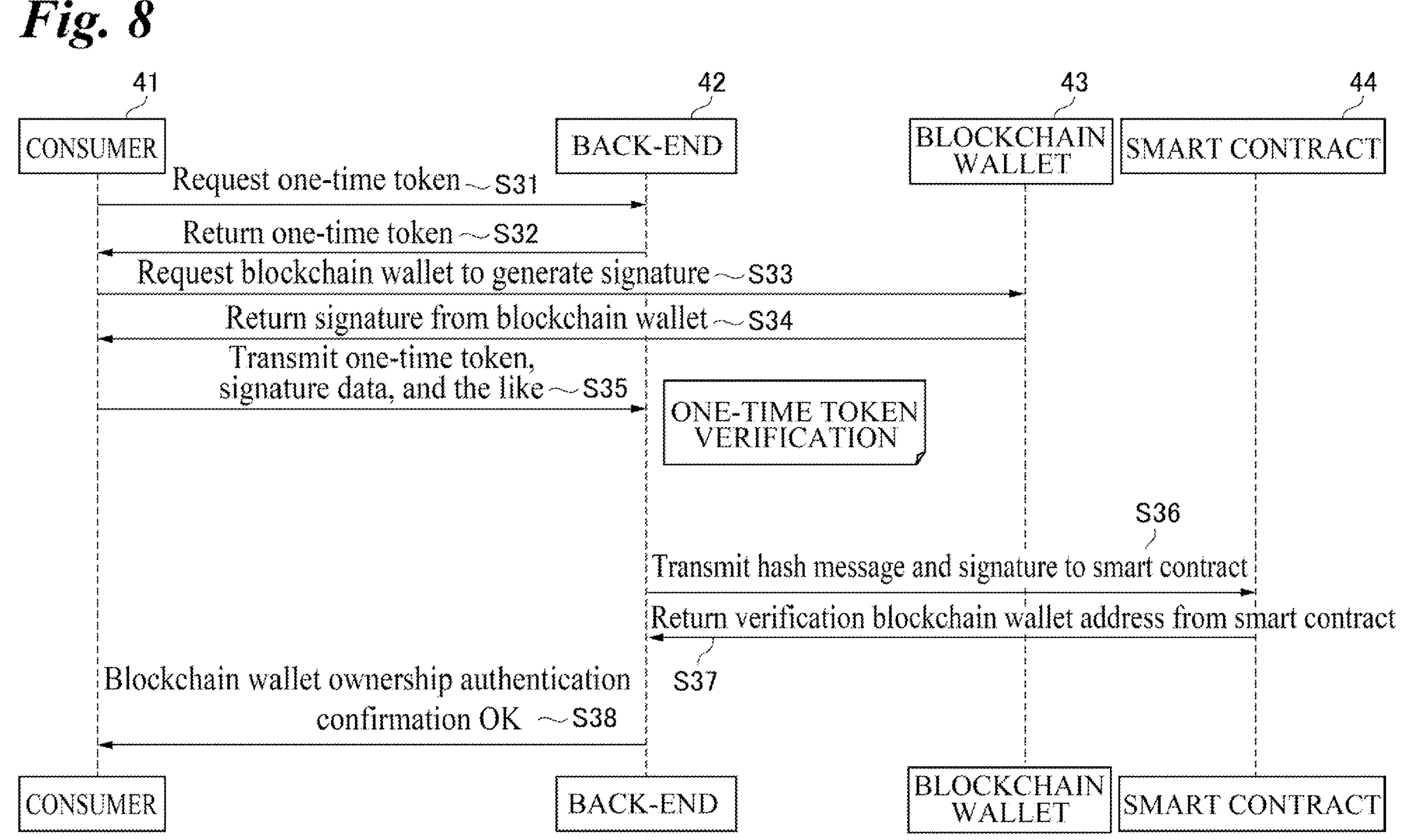
Fig. 8
41
CONSUMER
42
BACK-END
43
BLOCKCHAIN WALLET
44
SMART CONTRACT
Request one-time token
S31
Return one-time token
S32
Request blockchain wallet to generate signature
S33
Return signature from blockchain wallet
S34
Transmit one-time token, signature data, and the like
S35
ONE-TIME TOKEN VERIFICATION
S36
Transmit hash message and signature to smart contract
Return verification blockchain wallet address from smart contract
S37
Blockchain wallet ownership authentication confirmation OK
S38
CONSUMER
BACK-END
BLOCKCHAIN WALLET
SMART CONTRACT

*Fig. 9A*
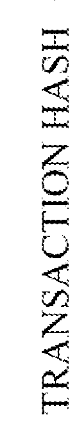
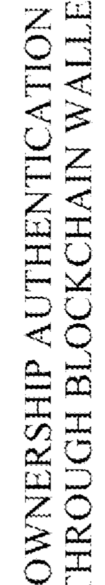
*Fig. 9B*
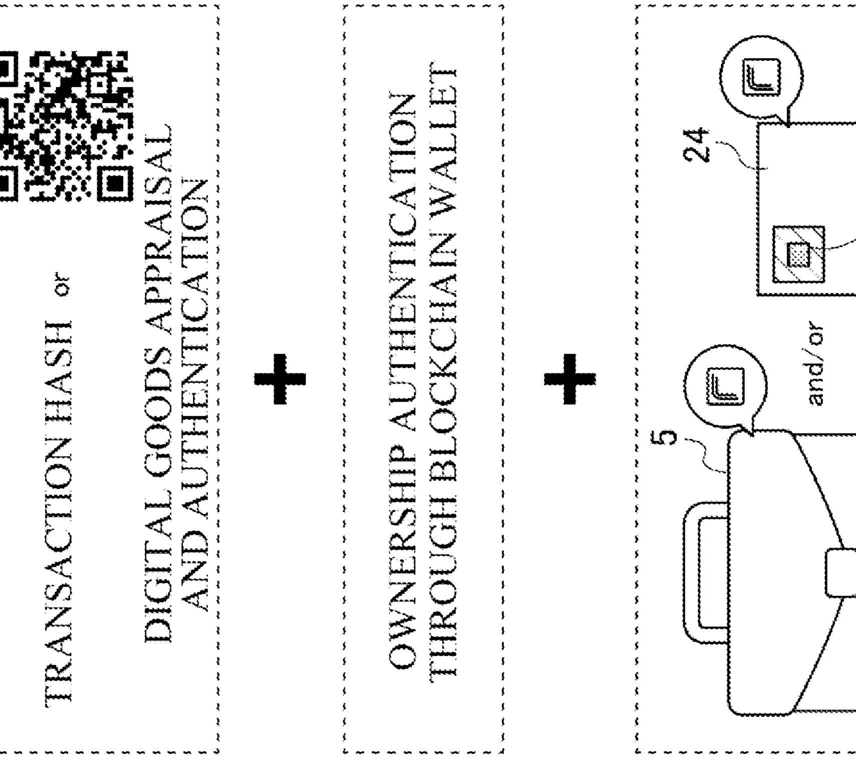

IDENTIFIER or TWO-DIMENSIONAL CODE CORRESPONDING TO IDENTIFIER

+

ANALOG GOODS APPRAISAL AND AUTHENTICATION

IDENTIFIER or TWO-DIMENSIONAL CODE CORRESPONDING TO IDENTIFIER

+

ANALOG GOODS APPRAISAL AND AUTHENTICATION

IDENTIFIER or TWO-DIMENSIONAL CODE CORRESPONDING TO IDENTIFIER

+

ANALOG GOODS APPRAISAL AND AUTHENTICATION

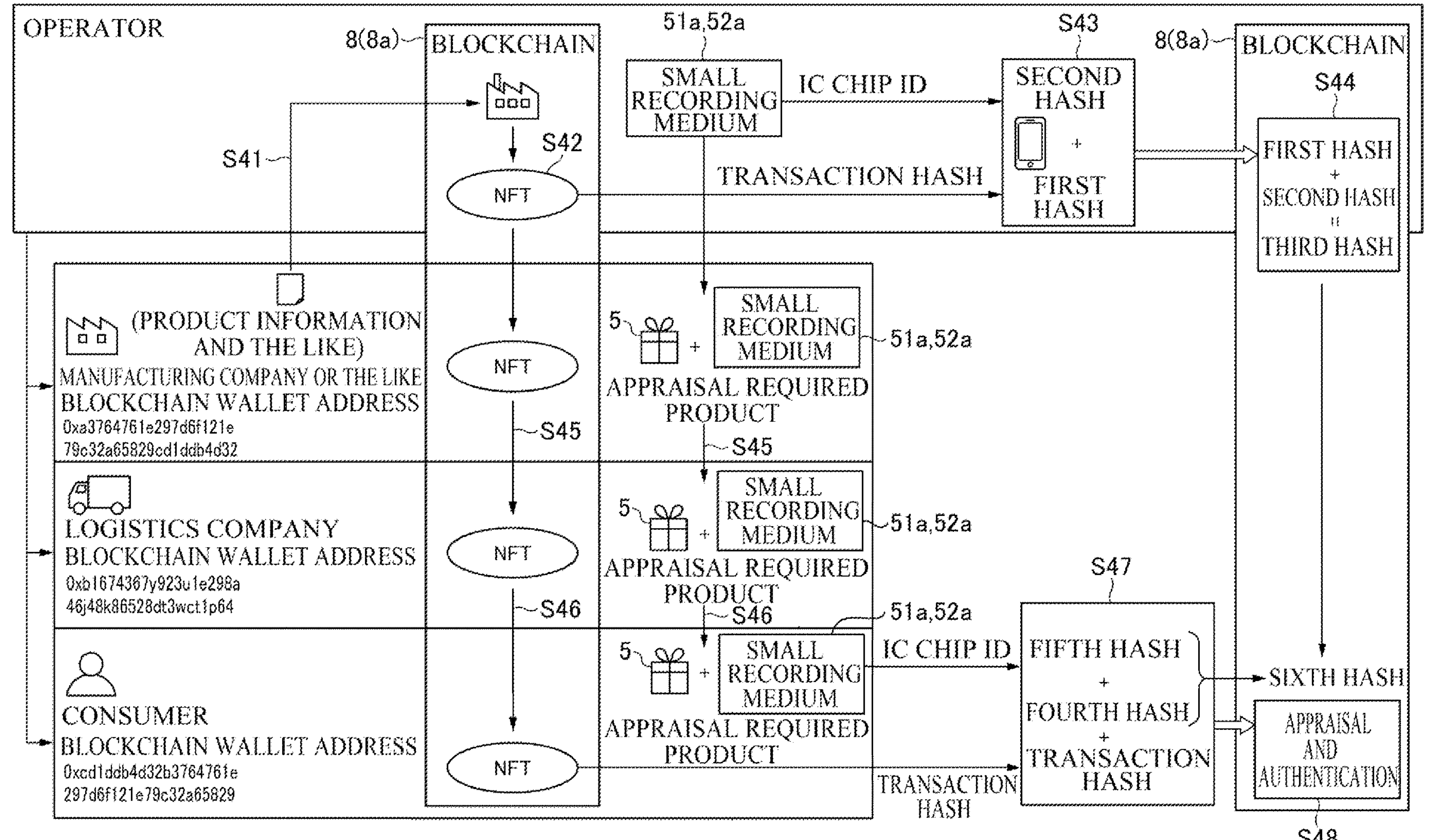
Fig. 12
OPERATOR
8(8a)
BLOCKCHAIN
S41
S42
NFT
51a,52a
SMALL RECORDING MEDIUM
IC CHIP ID
TRANSACTION HASH
S43
SECOND HASH
+
FIRST HASH
8(8a)
BLOCKCHAIN
S44
FIRST HASH
+
SECOND HASH
=
THIRD HASH
(PRODUCT INFORMATION AND THE LIKE)
MANUFACTURING COMPANY OR THE LIKE
BLOCKCHAIN WALLET ADDRESS
0xa3764761e297d6f121e
79c32a65829cd1ddb4d32
S45
5
APPRAISAL REQUIRED PRODUCT
51a,52a
LOGISTICS COMPANY
BLOCKCHAIN WALLET ADDRESS
0xb1674367y923u1e298a
46j48k86528dt3wct1p64
S46
CONSUMER
BLOCKCHAIN WALLET ADDRESS
0xcd1ddb4d32b3764761e
297d6f121e79c32a65829
S47
FIFTH HASH
+
FOURTH HASH
+
TRANSACTION HASH
SIXTH HASH
APPRAISAL AND AUTHENTICATION
S48

PRODUCT APPRAISAL AND AUTHENTICATION SYSTEM AND METHOD

TECHNICAL FIELD

The present invention relates to a system and a method for appraising and authenticating a product that requires an appraisal and authentication (hereinafter also referred to as an appraisal required product), such as a bag, a case, a garment, a watch, an artistic craft, and an automobile.

BACKGROUND ART

Appraisal required products, such as a bag, a case, a garment, a watch, an artistic craft, and an automobile, move through complicated distribution channels in which they are usually manufactured by a manufacturing company, a manufacturer, an author, or the like and then sold to a consumer through distributors, such as a logistics provider, a wholesaler, and a retailer. For these appraisal required products, an appraisal and authentication, that is, a proof that the product is not an imitation but a genuine product is required by consumers in processes of manufacture and distribution. Further, in recent years, the appraisal required products are very frequently sold to consumers via the Internet, and used items of the appraisal required products (including any n-th order distribution including secondary distribution and tertiary distribution) are similarly sold to consumers via the Internet. Furthermore, since purchase and sale between consumers have been increasing, the need for a more multifaceted appraisal and authentication of these appraisal required products is increasing.

A certificate (hereinafter also referred to as a "guarantee card") for certifying and guaranteeing that the product is a genuine product is usually issued to the appraisal required product. Information about goods (hereinafter also referred to as "product information"), such as a brand name, a product number, a manufacturing company/manufacturer (author), a manufacturing place, and a date of manufacture of the goods, is described in the guarantee card. However, in recent years, it has become possible to obtain only the guarantee card through the Internet or the like. Therefore, an appraisal and authentication by the guarantee card is not sufficiently reliable.

Conventionally, there is disclosed a method in which a medium, such as a plastic card, to which an IC chip that stores information is attached is used as a certificate and the validity of the certificate is determined by comparing information printed on the surface of the certificate with the information read from a memory of the IC chip (for example, see Patent Document 1). However, when applying the method disclosed in Patent Document 1 to the appraisal required product, it is possible to confirm the validity of the guarantee card itself because forgery is difficult, but only a product number that is stamped on the product links this guarantee card to the product. Therefore, it is difficult to sufficiently perform an appraisal and authentication.

There is also disclosed a technique in which an IC chip is attached to an appraisal required product and product information recorded on the IC chip can be read by a smartphone, a mobile phone, or the like (for example, see Patent Document 2). However, when applying the technique disclosed in Patent Document 2 to the appraisal required product and reading the above product information, it is possible for a third person other than the distributors or the consumer to acquire the product information in a case where a password is not set. Consequently, it is possible for the third person to acquire product information, such as whether the appraisal required product is a genuine product, and whether the date of manufacture of the appraisal required product is new, that the consumer does not want the third person to know. On the other hand, when a password is set, the password itself is unknown while the appraisal required product moves through a complicated distribution channel, and there is a possibility that an appraisal and authentication cannot be performed when necessary. Additionally, the password itself is possibly hacked.

Further, there is also disclosed a technique of providing a serial code to a product, reading the serial code with a serial code reader, and inquiring of a product database to perform an appraisal and authentication of the product (for example, see Patent Document 3). However, when the technique disclosed in Patent Document 3 is applied to the appraisal required product, the same problem as that when the technique disclosed in Patent Document 2 is applied occurs.

In view of this, there is proposed a new method in which an appraisal and authentication of goods is performed by multi-signature authentication using two or more of an appraisal required product that a small recording medium is attached to or incorporated in and a guarantee card that a small recording medium is attached to or incorporated in as well (a microchip (IC chip), a two-dimensional code, a digital watermark, or the like can be appropriately used depending on the shape, the structure, the size, or the like) in recent years (for example, see Patent Document 4).

According to the technique disclosed in Patent Document 4, a small recording medium storing a secret key and product information regarding an appraisal required product is attached to or incorporated in each of the appraisal required product and a guarantee card (a microchip (IC chip), a two-dimensional code, a digital watermark, or the like depending on the shape, the structure, the size, or the like). Then, the product information and transaction information at respective distribution stages until the appraisal required product reaches a consumer are recorded on a blockchain. The consumer reads the product information and the transaction information from the blockchain using the respective secret keys assigned to the appraisal required product and the guarantee card. This allows only the consumer to easily perform an appraisal and authentication with high reliability. Additionally, a manufacturing company, a manufacturer, an author, and the like sequentially write the product information to the blockchain, and a logistics provider, a wholesaler, a retailer, and the like sequentially write the transaction information to the blockchain, so that it is possible to accurately record the product information and the transaction information while complementing each other, and furthermore, it is possible to strongly prevent the product information and the transaction information from being tampered.

Patent Document 1: JP-A-2001-357377

Patent Document 2: WO 2014/207890

Patent Document 3: JP-A-2020-35197

Patent Document 4: Japanese Patent No. 6894033

DISCLOSURE OF THE INVENTION

Problems to be Solved by the Invention

However, the appraisal required product obviously includes not only analog (tangible, physical) goods (hereinafter also referred to as analog goods), but also digital goods (hereinafter also referred to as digital goods). The digital goods are, for example, a digital image, a digital sound, digital music, a digital video, and the like. Social needs for a further strong and highly reliable multifaceted appraisal and authentication for the digital goods have been especially becoming apparent together with the spread of the Internet in recent years.

In Patent Document 4 described above, the focus is put on the analog goods, and the description of an appraisal and authentication system and method for the digital goods is not sufficient.

Therefore, the present invention is derived in consideration of the above-described problem, and it is an object of the present invention to provide an appraisal and authentication system and method capable of performing a further strong and highly reliable multifaceted appraisal and authentication for an appraisal required product in addition to the technique disclosed in Patent Document 4 described above.

Solutions to the Problems

A product appraisal and authentication system according to a first invention includes a distributed file server, a dedicated platform, and recording means. The distributed file server generates a hashed identifier individually assigned to an appraisal required product based on digital goods data of the appraisal required product. The dedicated platform outputs a transaction hash or a two-dimensional code corresponding thereto generated when a non-fungible token (NFT) of the appraisal required product associated with the identifier generated in the distributed file server is recorded on a blockchain. The recording means records a first blockchain wallet address of an owner of the NFT of the appraisal required product at a transfer destination in association with the NFT every time the owner changes. An appraisal and authentication of the appraisal required product is performed by, in the appraisal and authentication, directly acquiring a second blockchain wallet address from an appraisal authenticating person, reading a first blockchain wallet address associated with an NFT that corresponds to a transaction hash or a two-dimensional code corresponding thereto acquired from the appraisal authenticating person from the recording means, and determining an identity between the read first blockchain wallet address and the second blockchain wallet address.

In the product appraisal and authentication system according to a second invention, which is in the first invention, the appraisal and authentication is further performed using the appraisal required product, and the transaction hash or the two-dimensional code output from the dedicated platform and generated, and a small recording medium ($a_1$) that records a secret key $\alpha_1$ and product information on the appraisal required product is attached to or incorporated in the appraisal required product. The product information and transaction information at respective distribution stages until the appraisal required product reaches a consumer are recorded on a blockchain. The product appraisal and authentication system further includes: an application [A] used for writing the product information and the transaction information to the blockchain by a manufacturing company, a manufacturer, an author, and various business operators; and an application [B] used for reading the product information and the transaction information from the blockchain by the consumer. The dedicated platform additionally generates a third hash based on a first hash and a second hash, and records the third hash on the blockchain. The first hash is generated based on the transaction hash, and the second hash is obtained when the manufacturing company, the manufacturer, the author, and the various business operators write the product information and/or the transaction information to the blockchain using the application [A]. The appraisal and authentication of the appraisal required product is performed by, in the appraisal and authentication, additionally generating a sixth hash based on a fourth hash and a fifth hash, and determining both of an identity between the first blockchain wallet address and the second blockchain wallet address and an identity between the third hash and the sixth hash. The fourth hash is generated based on the transaction hash or the two-dimensional code corresponding thereto acquired from the appraisal authenticating person, and the fifth hash is read from the blockchain based on the product information and the transaction information with the secret key $\alpha_1$ assigned to the appraisal required product using the application [B] by the appraisal authenticating person.

In the product appraisal and authentication system according to a third invention, which is in the first invention, the appraisal and authentication is performed using a guarantee card, and the transaction hash or the two-dimensional code output from the dedicated platform and generated, and a small recording medium (b) that records a secret key $\beta_1$ and product information on an appraisal required product is attached to or incorporated in the guarantee card. The product information and transaction information at respective distribution stages until the appraisal required product reaches a consumer are recorded on a blockchain. The product appraisal and authentication system further includes: an application [A] used for writing the product information and the transaction information to the blockchain by a manufacturing company, a manufacturer, an author, and various business operators; and an application [B] used for reading the product information and the transaction information from the blockchain by the consumer. The dedicated platform additionally generates a third hash based on a first hash and a second hash, and records the third hash on the blockchain. The first hash is generated based on the transaction hash, and the second hash is obtained when the manufacturing company, the manufacturer, the author, and the various business operators write the product information and/or the transaction information to the blockchain using the application [A]. The appraisal and authentication of the appraisal required product is performed by, in the appraisal and authentication, additionally generating a sixth hash based on a fourth hash and a fifth hash, and determining both of an identity between the first blockchain wallet address and the second blockchain wallet address and an identity between the third hash and the sixth hash. The fourth hash is generated based on the transaction hash or the two-dimensional code corresponding thereto acquired from the appraisal authenticating person, and the fifth hash is read from the blockchain based on the product information and the transaction information with the secret key $\beta_1$ assigned to the guarantee card using the application [B] by the appraisal authenticating person.

In the product appraisal and authentication system according to a fourth invention, which is in the second invention or the third invention, in the dedicated platform, the transaction hash is directly used as the first hash, and the transaction hash acquired from the appraisal authenticating person in the appraisal and authentication is directly used as the fourth hash.

Effects of the Invention

According to the present invention with the above-described configuration, NFTs are issued based on unique identifiers for only genuine products provided by the manufacturing company, the manufacturer, the author, or the like, and the NFTs are sequentially written to blockchain data. This allows accurately recording the NFT itself, and allows completely avoiding tampering of the NFT itself. Accordingly, the manufacturing company, the manufacturer, the author, or the like of the appraisal required product, or the consumer who has purchased the appraisal required product distributed through complicated distribution channels or sold via the Internet can easily perform an appraisal and authentication with high reliability.

BRIEF DESCRIPTION OF THE DRAWINGS

FIG. 3 is a flowchart illustrating a process of issuing a transaction hash and a two-dimensional code of an NFT from digital goods data.

FIG. 6 is a diagram illustrating an example of blockchain data that records each piece of information of product information and transaction information and is recorded on a dedicated platform in performing the analog goods appraisal and authentication.

FIG. 7 is a diagram for describing a processing operation of a hybrid appraisal and authentication.

FIG. 8 is a flowchart of ownership authentication through a blockchain wallet.

FIG. 9 is a diagram illustrating examples of performing a hybrid appraisal and authentication based on ownership authentication data (ownership authentication of a blockchain wallet), and the transaction hash or the two-dimensional code.

FIG. 12 is a diagram illustrating a process of an appraisal and authentication method using traceability.

DESCRIPTION OF PREFERRED EMBODIMENTS

The following describes a product appraisal and authentication system to which the present invention is applied in detail with reference to the drawings.

Figure 1:
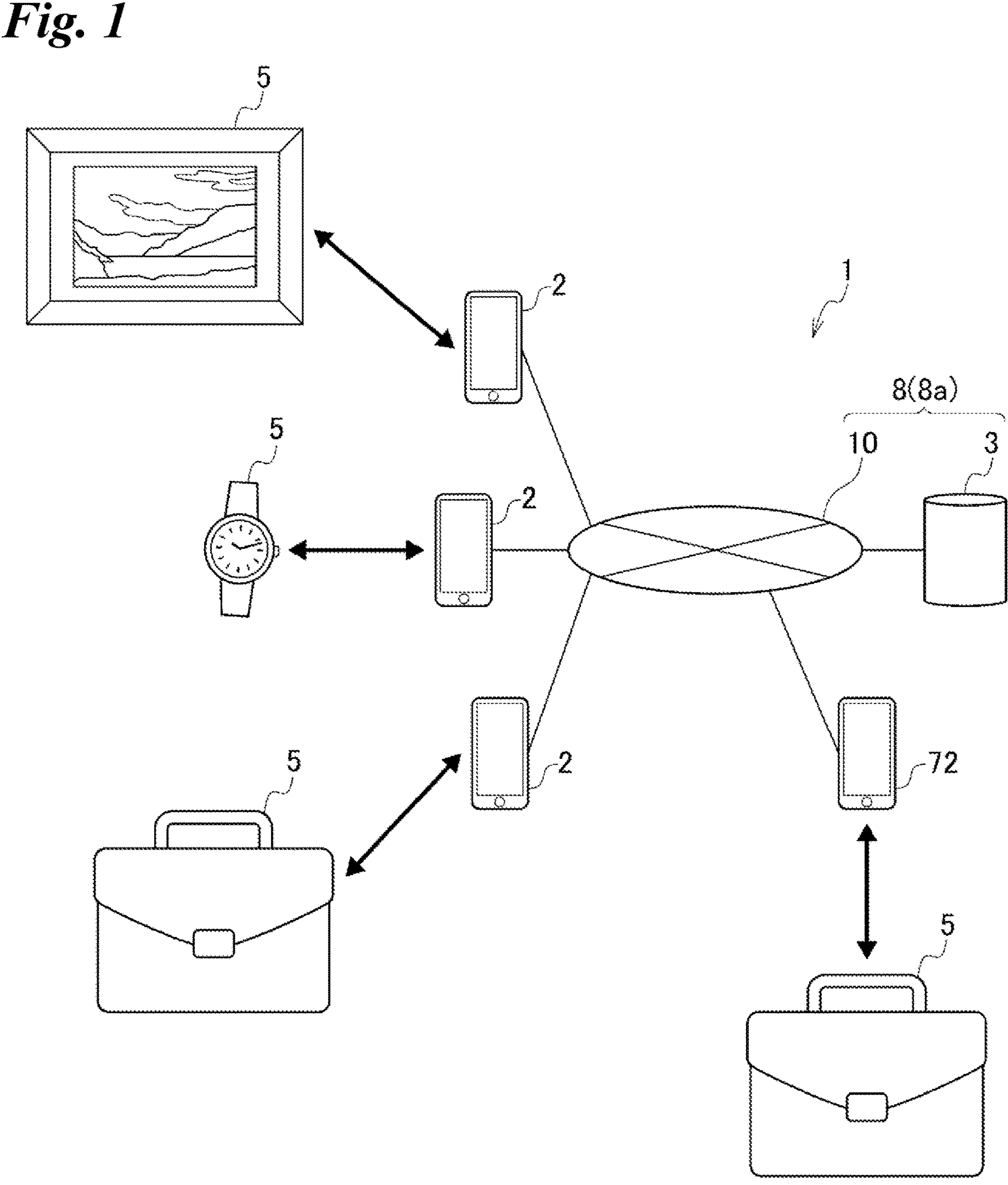
FIG. 1 is a diagram illustrating a system configuration of a product appraisal and authentication system to which the present invention is applied.

FIG. 1 illustrates a system configuration of a product appraisal and authentication system 1 to which the present invention is applied. In the product appraisal and authentication system 1, terminals 2 operated by a manufacturing company, a manufacturer, an author, or the like and a logistics provider, a wholesaler, a retailer, or the like (hereinafter, they are collectively referred to as various business operators and the like), a terminal 72 used by a consumer, and a distributed file server 3 are connected via a public communications network 10 including an Internet network, thus constituting a dedicated platform 8 via the public communications network 10.

While the terminal 2 is configured of, for example, an electronic device including a personal computer (PC) and the like, the terminal 2 may be embodied by any electronic device including a mobile phone, a smartphone, a tablet terminal, a wearable device, and the like in addition to the PC. The various business operators and the like operate the terminals 2 to perform various kinds of operations for generating an identifier from an appraisal required product 5. The appraisal required product 5 as an object of an appraisal and authentication can be roughly classified into analog goods and digital goods. For example, the analog goods include any product that needs to be appraised and authenticated, such as a bag, a case, a garment, a watch, an artistic craft, and an automobile. The digital goods include any digital content that needs to be appraised and authenticated, such as a digital image, a digital sound, digital music, and a digital video. The appraisal required product 5 includes not only a new article but also a used item (any n-th order distribution including secondary distribution and tertiary distribution).

While the terminal 72 is similarly configured of an electronic device including a PC and the like, the terminal 72 may be embodied by any electronic device including a mobile phone, a smartphone, a tablet terminal, a wearable device, and the like in addition to the PC. The consumer operates the terminal 72, and attempts to appraise and authenticate the appraisal required product 5.

The distributed file server 3 is a distributed file system to connect the terminals 2 to the same file system, and is configured of what is called the Inter Planetary File System (IPFS) or the like, but the distributed file server 3 is not limited thereto. The various business operators and the like who access the public communications network 10 via the terminals 2 provide data to the distributed file server 3, and the consumer can request the data in a Peer to Peer (P2P) format. The distributed file server 3 is a location storing any digital content that needs to be appraised and authenticated, such as a digital image, a digital sound, digital music, and a digital video of the appraisal required product 5, and a character string of a plurality of digits referred to as an identifier is generated as described below simultaneously with the storing. When the identifier of the appraisal required product 5 is identified, in a case of a new article, while completely the same image is provided, a unique character string is generated for the identifier because unique additional information, such as a commodity control number, is added together with the digital content.

In a case of a used item, since the used item is individually characterized digital goods due to individually having damage or a scratch, losing the shape, or the like, a unique character string is generated for the identifier. Note that the characterized digital goods distinctive of the used item is very important for an appraisal and authentication in the resale industry. For example, in a case where a person who has purchased a used watch brings a fake product with which the watch is replaced in a store of the purchase, and requests return, an NFT corresponding to the digital goods or an identifier described later stored on a blockchain can be used as a proof in checking a difference between the watch sold to the customer and the watch that the customer brings.

The dedicated platform 8 refers to a blockchain 8*a*. As the blockchain 8*a*, a blockchain with a P2P network, such as a distributed ledger, can be used. On the blockchain 8*a*, in addition to product information of the appraisal required product 5 and transaction information at respective distribution stages until the appraisal required product 5 reaches the consumer, for example, an identifier generated by hashing based on the digital goods data of the appraisal required product 5 is recorded.

Note that for the blockchain 8*a* here, any type of blockchains including a public blockchain, a private blockchain, a consortium blockchain, and the like may be applied in addition to the blockchain with the P2P network, such as a distributed ledger.

Recording on the blockchain includes a concept of storing a state in which a hash value for authenticating specific data is connected.

In the product appraisal and authentication system 1 to which the present invention is applied, as described below, an appraisal and authentication roughly divided into two types of a digital goods appraisal and authentication and a hybrid appraisal and authentication can be achieved.

Digital Goods Appraisal and Authentication

Figure 2A:
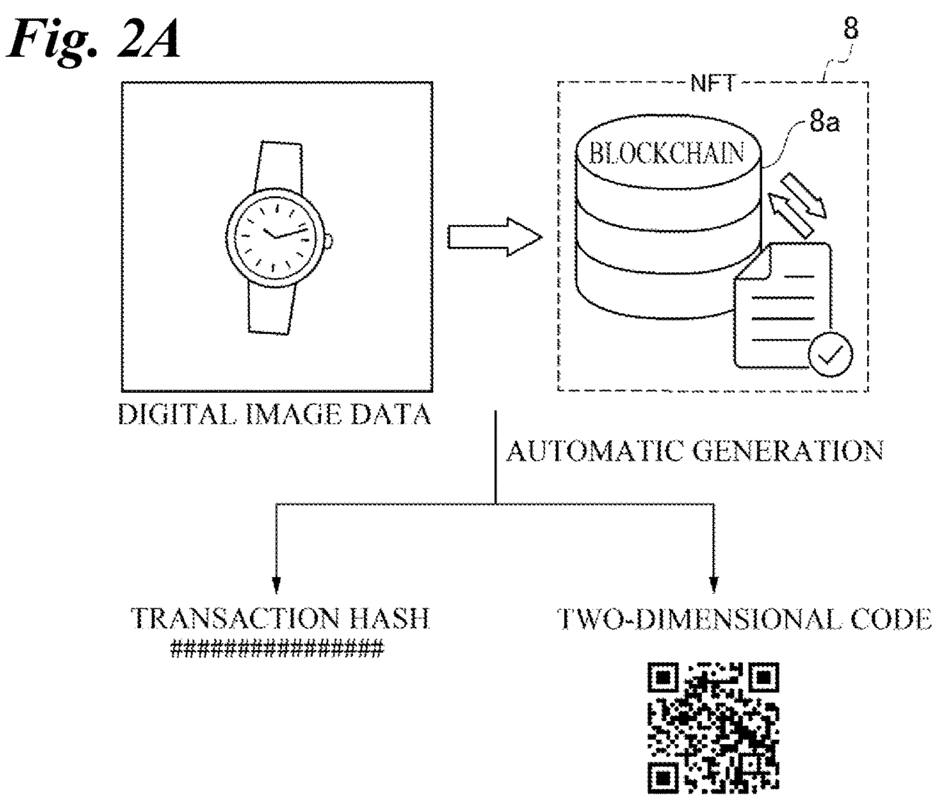
FIG. 2 is a diagram for describing a processing operation of a digital goods appraisal and authentication.

First, a processing operation of the digital goods appraisal and authentication will be described. As illustrated in FIG. 2A, in the appraisal and authentication of the digital goods, digital goods data on the appraisal required product 5 is acquired. The digital goods data is acquired from an object of the appraisal and authentication. The digital goods data is digital image data including digital goods data obtained by taking an image of the appraisal required product 5 using the terminal 2, a digital camera, or the like. For the digital goods data, in addition to the digital goods data obtained by taking an image with the terminal 2 by the manufacturing company, the manufacturer, the author, or the like, one originally assigned to or associated with the appraisal required product 5 and recorded on a storage medium may be used. The digital goods data is any digital content that needs to be appraised and authenticated, such as a digital image, a digital sound, digital music, and a digital video, and as an extension, for example, jpg, png, gif, mp3, or mov is assigned.

The manufacturing company, the manufacturer, the author, or the like registers the digital goods data of the appraisal required product 5 obtained as described above on the dedicated platform 8. As a result, an NFT is issued from the blockchain 8*a* that this dedicated platform 8 refers to, and a transaction hash and a two-dimensional code corresponding to the NFT are automatically generated. It becomes possible to determine whether the appraisal required product 5 is an imitation or a genuine product via the transaction hash and the two-dimensional code thus generated of the NFT thus issued.

Figure 2B:
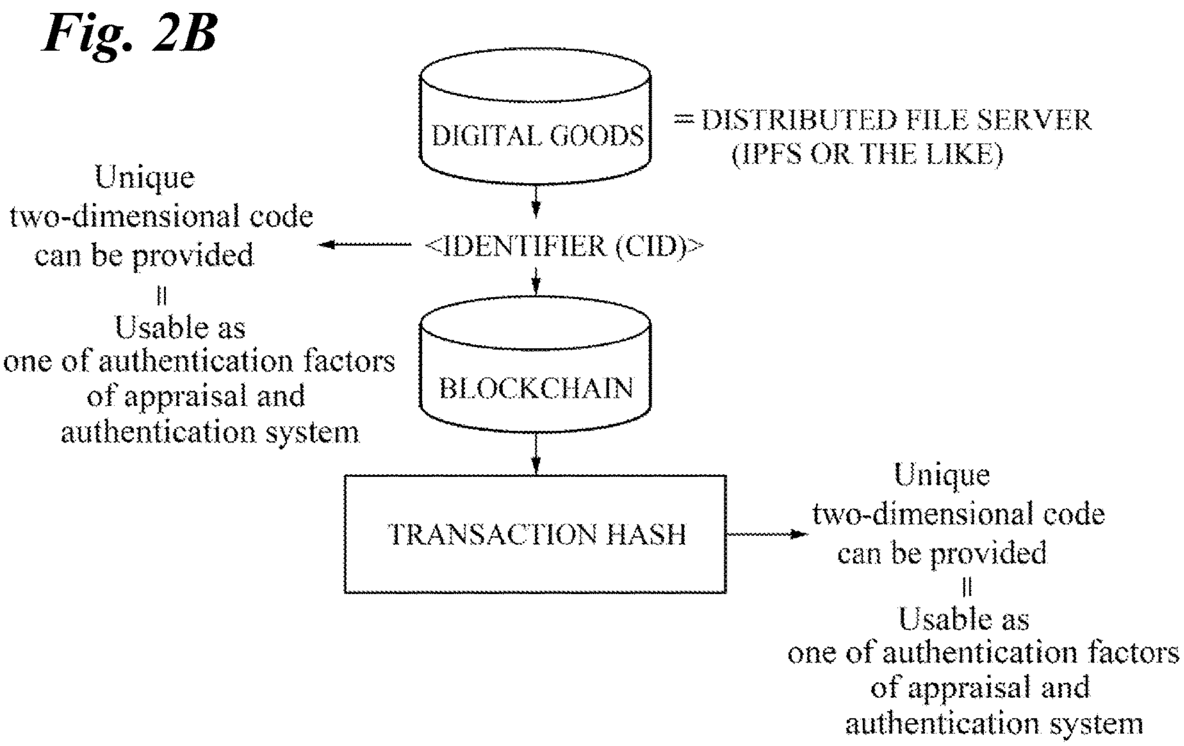

As illustrated in FIG. 2B, the digital goods data is recorded on the distributed file server, the identifier is issued, and a unique two-dimensional code A can be provided from this. A unique two-dimensional code B can be provided from the transaction hash obtained via the blockchain as well. While the two-dimensional code A and the two-dimensional code B are mutually different, they can be used as one of authentication factors in the appraisal and authentication system. While the two-dimensional code B is well known, additionally adding the two-dimensional code A allows enhancing the security of multi-signature authentication. Note that only the two-dimensional code A may be used as the authentication factor, or only the two-dimensional code B may be used as the authentication factor. Further, to increase the strength of the multi-signature authentication, the two-dimensional codes A and B may be used together as the authentication factor.

FIG. 3 is a flowchart illustrating a process of issuing the transaction hash and the two-dimensional code of the NFT from the digital goods data as described above.

First, in Step S11, the manufacturing company, the manufacturer, the author, or the like acquires the digital goods data of the appraisal required product 5, and registers it on the dedicated platform 8. This processing operation for registering the digital goods data is performed by accessing the dedicated platform 8 via the terminal 2 by the manufacturing company, the manufacturer, the author, or the like. In this case, the manufacturing company, the manufacturer, the author, or the like may access the dedicated platform 8 in the terminal 2 and execute the processing operation by preliminarily installing applications necessary for performing various kinds of procedures.

Next, the process proceeds to Step S12, and the dedicated platform 8 side accepts the register of the digital goods data. The dedicated platform 8 may be configured of what is called an NFT marketplace or the like. When the register of the digital goods data is accepted, the dedicated platform 8 issues a register number of the NFT marketplace to the digital goods data in each case. The register number is unique because it is issued every time the register of the digital goods data is accepted.

Next, the process proceeds to Step S13, information on the manufacturing company, the manufacturer, the author, or the like in addition to the digital goods data whose register has been accepted in Step S12 and the register number issued in Step S12 is put together in one folder or the like, and the process of registering on the distributed file server 3 is performed. Examples of the information on the manufacturing company, the manufacturer, the author, or the like in detail include a name, corporate information, a pen name, and a pseudonym, and examples of work information include information on a title of a work, a production year, a release year, or the like, a work specification (a size, a format, a used technique), a copyright of a work, and rights information included in a work, such as a portrait right and a design right. In the registration, the method of registering the digital goods data, the register number, and the information on the manufacturing company, the manufacturer, the author, or the like by putting them together in one folder is an example, and it may be replaced with any method insofar as these three kinds of information of the digital goods data, the register number, and the information on the manufacturing company, the manufacturer, the author, or the like (hereinafter, they are collectively referred to as additional information) are registered in a manner of being mutually associated.

Next, the process proceeds to Step S14, and IDs unique to respective pieces of the registered additional information are issued by the distributed file server 3. The ID issued to the digital goods data is referred to as a first ID, the ID issued to the register number is referred to as a second IDa, and the ID issued to the information on the manufacturing company, the manufacturer, the author, or the like is referred to as a second IDb.

For the digital goods data, when another piece of completely the same digital goods data is present, or when the digital goods data is replicated by another person, the same first ID is issued in some cases. Meanwhile, since the register number is unique, the second IDa is also unique. The information on the manufacturing company, the manufacturer, the author, or the like is not unique depending on contents, for example, a company name, a birth date, a name of a copyright holder, and a title of a copyright work, in some cases. However, since setting of individually assigning the unique ID can be made, most of the second IDb are also unique. For example, since time information, such as a date and time, and seconds, registered on the distributed file server 3 can be added, the accuracy of uniqueness can be enhanced. Note that in Step S14, at least the digital goods data is recorded on the distributed file server 3. Moreover, the distributed file server 3 is provided with a configuration with multiple layers to avoid losing the digital goods data by employing a distributed type of configuration. Alternatively, such a configuration can be set.

Next, the process proceeds to Step S15, and a unique identifier is generated based on the mutually associated additional information. The generated identifier is associated with the additional information, and can serve as an identifier included in the additional information thereby. The identifier is generated based on the first ID, the second IDa, and the second IDb described above. Since the second IDa is unique, and the second IDb is also unique, even if the same digital goods data (the first ID) is an identical or replicated one, the newly generated identifier is always unique. This one to be hashed and generated is referred to as an identifier.

The identifier may be generated based on a rule specified by the distributed file server 3 based on the additional information put in a folder.

A two-dimensional code may be generated based on the generated identifier (Step S23).

The process proceeds to Step S16, and the dedicated platform 8 receives the identifier from the distributed file server 3. When the two-dimensional code is generated in Step S23, the dedicated platform 8 receives the two-dimensional code from the distributed file server 3.

Next, the process proceeds to Step S17, and the dedicated platform 8 transmits the identifier based on the additional information to the blockchain 8*a*.

In Step S18, the blockchain 8*a* records an NFT issued based on the identifier transmitted from the dedicated platform 8 on the blockchain 8*a*. By thus recording the NFT associated with the identifier on the blockchain 8*a* as blockchain data, it is possible to completely avoid tampering of the NFT. That is, each block in the blockchain 8*a* includes a time stamp and a link (a hash value) to a previous block, and data in the block cannot be changed retroactively.

Next, the process proceeds to Step S19, and a transaction hash and/or a two-dimensional code corresponding to the NFT is generated. The generation of the transaction hash and/or the two-dimensional code may be performed simultaneously with recording on the blockchain 8*a*. The transaction hash here is represented by, for example, a character string of about 64 digits in a case of Ethereum or the like for identifying the NFT. As a substitution of the transaction hash, a combination of a contract address and a token ID may be used. The contract address here is a unique address with a contract deployed on a blockchain (Ethereum or the like). The token ID is an NFT identified by the contract address. The two-dimensional code is a code for identifying the transaction hash. The issued transaction hash and/or two-dimensional code is transmitted to a marketplace constituting the dedicated platform 8, and the marketplace receives them (Step S20).

The blockchain 8*a* transmits the NFT to the various business operators and the like as necessary (Step S21). The NFT to be transmitted may be substituted with the issued transaction hash or two-dimensional code. The various business operators and the like receive the NFT (Step S22). The various business operators and the like can receive the transaction hash or the two-dimensional code via the terminals 2.

The authority for acquiring the digital goods data and registering it on the dedicated platform 8 is provided exclusively to the various business operators and the like. For example, when the appraisal required product 5 is a bag, a case, a garment, a watch, an artistic craft, an automobile, or the like, the authority for registering the digital goods data on the dedicated platform 8 may be provided only to the various business operators and the like or a person having a sales license of the product as an agent.

The various business operators and the like or a consumer who has purchased a new or used appraisal required product 5 as a genuine product receives the transaction hash or the two-dimensional code together with the appraisal required product 5 from the various business operators and the like or the marketplace constituting the dedicated platform 8. The various business operators and the like or the consumer who has received the transaction hash or the two-dimensional code can access the blockchain 8*a* of the dedicated platform 8 using the transaction hash or the two-dimensional code, and can read the NFT of the appraisal required product 5 recorded thereon. This allows only the true various business operators and the like or the true consumer having the transaction hash or the two-dimensional code to easily perform an appraisal and authentication with high reliability. Therefore, a third person without the transaction hash or the two-dimensional code cannot perform the appraisal and authentication itself.

Thus, in the digital goods appraisal and authentication, the various business operators and the like sequentially write the unique NFT derived from the unique identifier of only the genuine product of the appraisal required product 5 to blockchain data 8*b* of the dedicated platform 8. This allows accurately recording the NFT itself, and completely avoiding tampering of the NFT itself. Therefore, the various business operators and the like of the appraisal required product 5 or the consumer who has purchased the appraisal required product 5 distributed through a complicated distribution channel or sold through the Internet can easily perform the appraisal and authentication with high reliability.

The digital goods appraisal and authentication is not limited to the above-described embodiment. For example, in Step S13, while the case where the additional information is collectively registered in addition to the digital goods data and the identifier is generated has been described, it is not limited to this, and any one may be employed insofar as at least any information is associated with the digital goods data and registered. The information here includes any information and data related to the digital goods data or generated with the digital goods data, such as a register number and information on a manufacturing company, a manufacturer, an author, or the like as described above. The additional information may include only any one of the register number and the information on the manufacturing company, the manufacturer, the author, or the like. The additional information may include any information and data related to the digital goods data or generated with the digital goods data instead of including neither the register number nor the information on the manufacturing company, the manufacturer, the author, or the like.

Hybrid Appraisal and Authentication

Next, a processing operation of the hybrid appraisal and authentication will be described. In the hybrid appraisal and authentication, in addition to the above-described digital goods appraisal and authentication, an analog goods appraisal and authentication is further combined, and thereby an appraisal of the appraisal required product 5 is performed with higher accuracy.

Figure 4:
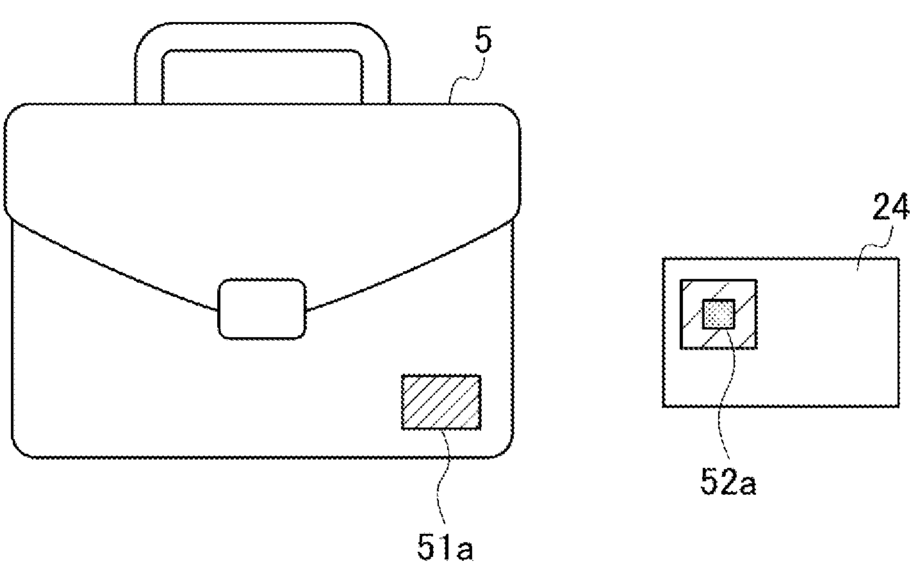
FIG. 4 is a diagram for describing a configuration necessary for an analog goods appraisal and authentication.

FIG. 4 is a schematic diagram illustrating an appraisal required product 5 and a guarantee card 24 sold and distributed together with the appraisal required product 5 in the analog goods appraisal and authentication. A small recording medium ($a_1$) 51*a* is attached to or incorporated in the appraisal required product 5, and the small recording medium ($a_1$) 51*a* stores information including a secret key $\alpha_1$ and product information (a brand name, a product number, a manufacturing company/manufacturer (author), a manufacturing place, a date of manufacture, and the like). A small recording medium (b) 52*a* is attached to or incorporated in the guarantee card 24, and the small recording medium (b) 52*a* stores information including a secret key $\beta_1$ and the product information. As the small recording medium ($a_1$) 51*a* and the small recording medium (b) 52*a*, a small recording medium or the like, such as an IC chip, a two-dimensional code, and a digital watermark, can be used as appropriate depending on the shape, the structure, the size, or the like of the appraisal required product 5 and the guarantee card 24.

The product information of the small recording medium ($a_1$) 51*a* of the appraisal required product 5 and the small recording medium (b) 52*a* of the guarantee card 24 is input by the various business operators and the like at the time of shipment of the appraisal required product 5.

Figure 5:
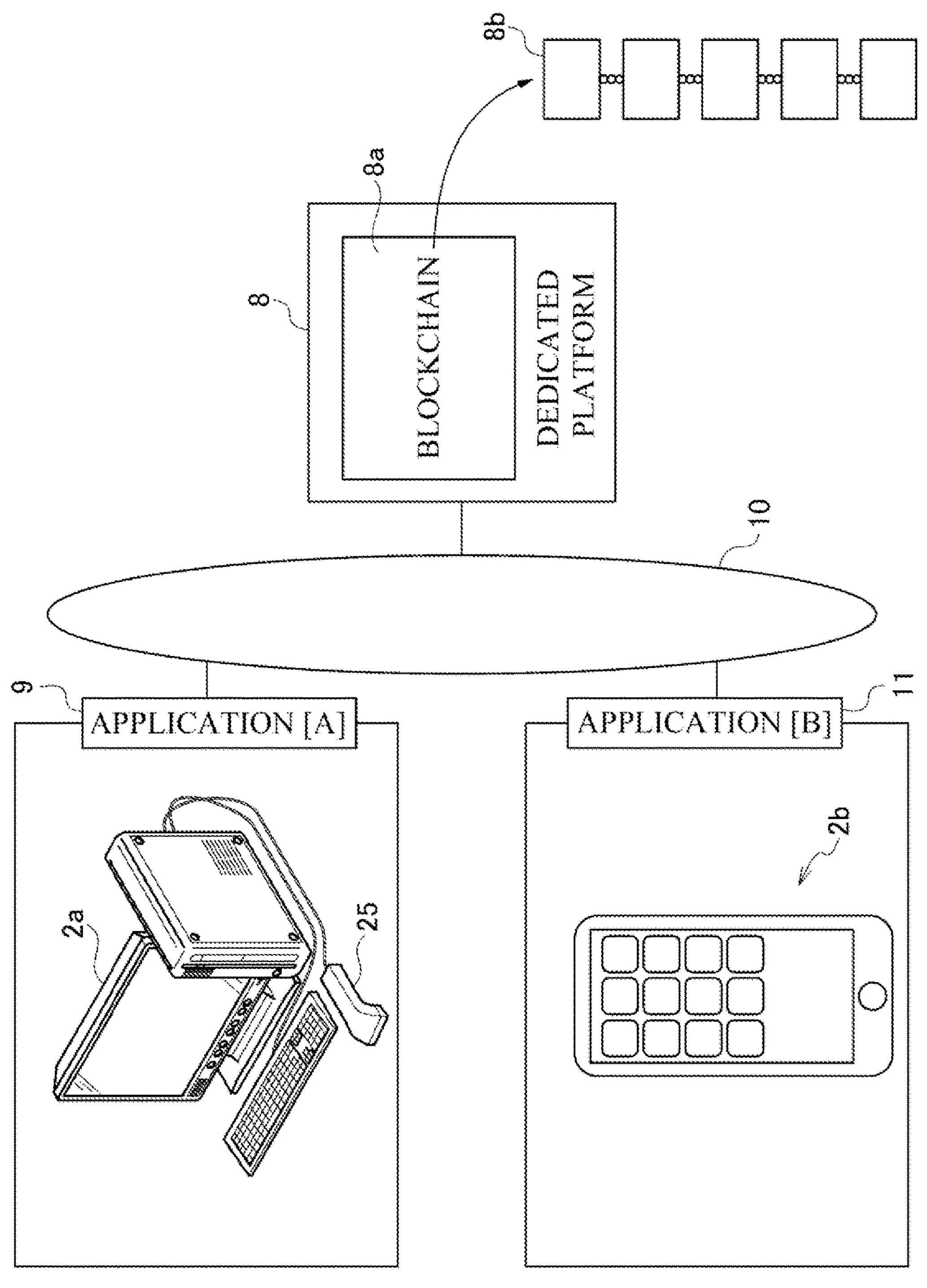
FIG. 5 is a schematic diagram illustrating one embodiment of the analog goods appraisal and authentication.

FIG. 5 is a schematic diagram illustrating one embodiment of the analog goods appraisal and authentication. In performing the analog goods appraisal and authentication, in addition to the respective components necessary for the above-described digital goods appraisal and authentication, the dedicated platform 8 that records, as the blockchain data 8*b* of the blockchain 8*a*, each piece of information of the product information of the appraisal required product 5 and the transaction information at respective distribution stages until the appraisal required product 5 reaches the consumer, a terminal 2*a* connected to the dedicated platform 8 via the public communications network 10 by an application [A] 9, and a terminal 2*b* connected to the dedicated platform 8 via the public communications network 10 by an application [B]11 are included.

The various business operators and the like write the product information and the transaction information to the blockchain data 8*b* of the dedicated platform 8 using the application [A] 9.

The consumer can use the application [B] 11 and use the secret key $\alpha_1$ assigned to the appraisal required product 5 and the secret key $\beta_1$ assigned to the guarantee card 24 to read the product information and the transaction information of the appraisal required product 5 written to the blockchain data 8*b* of the dedicated platform 8. This allows the consumer to easily perform highly reliable appraisal and authentication.

The application [A] 9 is downloaded to the terminal 2*a* and runs. With this, the various business operators and the like can write the product information and the transaction information to the blockchain data 8*b* of the dedicated platform 8. The application [B] 11 is downloaded to the terminal 2*b* and runs, and the consumer can read the product information and the transaction information of the appraisal required product 5 written to the blockchain data 8*b* of the dedicated platform 8.

The information including the secret key $\alpha_1$ and the product information recorded in the small recording medium ($a_1$) 51*a* of the appraisal required product 5 and the information including the secret key $\beta_1$ and the product information recorded in the small recording medium (b) 52*a* of the guarantee card 24 can be read via wireless communications by bringing a reader 25 connected to the terminal 2*a* or the terminal 2*b* configured as a smartphone close. In this case, the reading can be contactlessly performed by near field wireless communication, such as NearField Communication (NFC) and Radio Frequency IDentifier (RFID).

FIG. 6 illustrates an example of the blockchain data 8*b* in which each piece of the information of the product information and the transaction information is recorded on the dedicated platform 8 by the various business operators and the like for the appraisal required product 5 in performing the analog goods appraisal and authentication.

The appraisal required product 5 is shipped with the guarantee card 24 as a set after being manufactured by the manufacturing company, the manufacturer, the author, or the like. At the time of shipment, first, a person in charge of the manufacturing company, the manufacturer, the author, or the like writes, for example, a brand name, a product number, a manufacturing company, a manufacturing place, a date of manufacture, and the like to the blockchain data 8*b* of the dedicated platform 8 as information including the above-described product information and 5W1H information (who, when, where, what, why, how) using the application [A] 9.

Next, the person in charge of the manufacturing company, the manufacturer, the author, or the like uses the application [A] 9 to write information including an inspection result of the product information recorded by the person in charge of the manufacturing company, the manufacturer, the author, or the like and the 5W1H information to the blockchain data 8*b* of the dedicated platform 8.

Next, after the appraisal required product 5 is shipped from the manufacturing company, the manufacturer, the author, or the like, a logistics provider uses the application [A] 9 to write information including a date and time when the product was received from the manufacturing company, the manufacturer, the author, or the like, a date and time when the product was delivered to a wholesaler, and the 5W1H information to the blockchain data 8*b* of the dedicated platform 8.

After the appraisal required product 5 is received from the logistics provider, the wholesaler uses the application [A] 9 to write information including a date and time when the product is delivered from the logistics provider and the 5W1H information to the blockchain data 8*b* of the dedicated platform 8.

In this way, the product information and the transaction information of the various business operators and the like are sequentially written to the blockchain data 8*b* of the dedicated platform 8.

The authority to write the product information and the transaction information to the blockchain data 8*b* is given only to the various business operators and the like concerned with this information. For example, the various business operators and the like may be given only the authority to write the product information.

In this way, since the various business operators and the like sequentially write the product information and the transaction information of the appraisal required product 5, it is possible to accurately record the product information and the transaction information of the appraisal required product 5 even though the appraisal required product 5 is distributed through a complicated distribution channel, or is sold through the Internet.

Furthermore, by writing the product information and the transaction information to the blockchain data **8*b* of the dedicated platform 8, it is possible to completely avoid tampering of the product information and the transaction information. That is, each block in the blockchain data 8*b*** includes a time stamp and a link (a hash value) to a previous block, and data in the block cannot be changed retroactively.

The consumer who has purchased the new or used appraisal required product 5 can use the terminal **2*b* to use the secret key $\alpha_1$ assigned to the appraisal required product 5 and the secret key $\beta_1$ assigned to the guarantee card 24, and can use the application [B] 11 to read the product information and the transaction information of the appraisal required product 5 written to the blockchain data 8*b* of the dedicated platform 8. As a result, only a true consumer who owns the appraisal required product 5 and the guarantee card 24** can easily perform highly reliable appraisal and authentication.

Also in the analog goods appraisal and authentication, similarly, the consumer who has purchased the appraisal required product 5 distributed through a complicated distribution channel or sold through the Internet can easily perform the appraisal and authentication with high reliability. In the analog goods appraisal and authentication, the various business operators and the like sequentially write the product information and the transaction information of the appraisal required product 5 to the blockchain data **8*b* of the dedicated platform 8**. This allows accurately recording the product information and the transaction information, and completely avoiding tampering of the product information and the transaction information. Therefore, the reliability of the appraisal and authentication can be more enhanced.

The analog goods appraisal and authentication uses the secret key $\alpha_1$ assigned to the appraisal required product 5 and the secret key $\beta_1$ assigned to the guarantee card 24 to read the product information and the transaction information of the appraisal required product 5 written to the blockchain data **8*b* of the dedicated platform 8, so that only the true consumer who owns the appraisal required product 5 and the guarantee card 24 can perform appraisal and authentication. Therefore, a third person without the appraisal required product 5 or the guarantee card 24** cannot perform the appraisal and authentication itself.

In performing the analog goods appraisal and authentication, n small recording media including a small recording medium ($a_1$), and a small recording medium ($a_2$) storing information including a secret key $\alpha_2$ to a small recording medium ($a_n$) storing information including a secret key $\alpha_n$ can be attached to or incorporated in the appraisal required product 5, where n is an integer of 2 or more. As a result, a multi-signature in which the appraisal and authentication is established only when not only the secret key $\alpha_1$ and the secret key $\beta_1$, but also all the secret keys $\alpha_2$ to $\alpha_n$ are available can be adopted, and the appraisal accuracy can be made more reliable. In addition, the n small recording media ($a_1$) to ($a_n$) are attached to or incorporated in each part of the appraisal required product 5, so that even when some of the parts are replaced with imitations, the imitations can be detected. For example, when the appraisal required product 5 is an automobile, the small recording medium is attached to or incorporated in each of a vehicle body and tires, so that the appraisal and authentication cannot be established unless all the parts are genuine products.

Further, in the appraisal and authentication system of the present invention, preferably, at least one of the small recording media ($a_1$) to ($a_n$) and the small recording medium (b) can have a GPS function. As a result, even when each part of the appraisal required product 5 and the guarantee card are lost or stolen, it is possible to easily detect their location.

When the hybrid appraisal and authentication in which the above-described digital goods appraisal and authentication is combined with the analog goods appraisal and authentication is performed, as illustrated in FIG. 7A, three of the appraisal required product 5 and the guarantee card 24 required in the analog goods appraisal and authentication, and the transaction hash or the two-dimensional code required in the digital goods appraisal and authentication are prepared.

Then, the product information and the transaction information of the appraisal required product 5 written to the blockchain **8*a* of the dedicated platform 8 are read with the secret key $\alpha_1$ assigned to the appraisal required product 5 and the secret key $\beta_1$ assigned to the guarantee card 24 using the terminal 72. Together with this, the transaction hash or the two-dimensional code is used to access an application installed in the terminal 72, and thus the appraisal and authentication is performed. The consistency of the transaction hash or the two-dimensional code can be determined in the application side, and additionally, whether both of the read product information and transaction information of the appraisal required product 5 are true or not can be determined. It can be determined that the appraisal required product 5** is a genuine product only when it is determined that these determination results are all true.

Even if the secret key $\alpha_1$ assigned to the appraisal required product 5 and the secret key $\beta_1$ assigned to the guarantee card 24 used for the analog goods appraisal and authentication are counterfeited or illegally copied, the hybrid appraisal and authentication cannot be passed through unless the appraisal and authentication with the transaction hash or the two-dimensional code used for the digital goods appraisal and authentication is performed. That is, the hybrid appraisal and authentication can provide the appraisal and authentication system with higher reliability by using the analog goods appraisal and authentication together with the digital goods appraisal and authentication.

While the case of preparing the three of the appraisal required product 5, the guarantee card 24, and the transaction hash or the two-dimensional code has been described as an example as illustrated in FIG. 7A, the present invention is not limited thereto. For example, as illustrated in FIG. 7B, the hybrid appraisal and authentication can be similarly performed by preparing two of the appraisal required product 5 or the guarantee card 24, and the transaction hash or the two-dimensional code.

That is, in the analog goods appraisal and authentication, the secret key $\alpha_1$ assigned to the appraisal required product 5 or the secret key $\beta_1$ assigned to the guarantee card 24 is used to read the product information and the transaction information of the appraisal required product 5 written to the blockchain **8*a* of the dedicated platform 8. In addition, by using the transaction hash or the two-dimensional code, the consistency can be determined via the application installed in the terminal 72. It can be determined that the appraisal required product 5** is a genuine product only when it is determined that these determination results are all true.

Alternatively, instead of the above-described analog goods appraisal and authentication, ownership authentication described below may be performed through a blockchain wallet for storing tokens, such as Ethereum. The ownership authentication of the blockchain wallet described below is an example, and it is obvious that any other ownership authentication means can be used as substitution without being limited thereto.

Instead of the above-described guarantee card 24, a microchip (an IC chip), a two-dimensional code, a digital watermark, or the like can be appropriately used depending on the shape, the structure, the size, or the like.

FIG. 8 illustrates a flowchart of the ownership authentication through the blockchain wallet.

In Step S31, first, a consumer requests a one-time token of a back-end. A consumer 41 here is a consumer of a blockchain wallet exclusive to crypto-assets usable as an extended function of a web browser or a smartphone application. The consumer 41 transmits and receives information through a front-end, and the front-end is a component that directly transmits and receives data with the consumer and means a web browser side (a client side) in web production. A back-end 42 means a process in a server side, and means a mechanism, a function, or a component, such as a server, a database, a function, and a program or a module performing a process, generally invisible to the consumer 41.

Next, the process proceeds to Step S31, and the back-end 42 returns the one-time token to the consumer. An expiration period of the one-time token may be, for example, a few seconds to a few minutes.

Next, the process proceeds to Step S33, and the consumer 41 requests a blockchain wallet 43 to generate a signature. The blockchain wallet 43 is a program for handling crypto-assets. In the blockchain wallet 43, an address or its secret key is not saved in an external server, and everything such as a money transfer works on a browser.

Next, the process proceeds to Step S34, and the blockchain wallet 43 returns the signature to the consumer 41.

Next, the process proceeds to Step S35, and the consumer transmits a message, the one-time token, signature data, and a blockchain wallet address to the back-end 42. That is, before signing, the consumer requests a one-time token for consumer authentication of the back-end 42, and uses it for signing. When the signature data is transmitted to the back-end 42, the above-described one-time token is transmitted together. The back-end 42 verifies the signature data and the one-time token.

The back-end 42 converts the message with the signature into hash data according to a standard. Then, the hash message and the signature data are transmitted to a smart contract 44 (Step S36). The smart contract 44 here is a mechanism for automatically executing a contract on the blockchain 8*a*, and works on a server of the blockchain 8*a*.

Next, the process proceeds to Step S37, and the smart contract 44 returns a verification address to the back-end 42. The back-end 42 checks the verification address. In this case, the back-end 42 confirms consistency between the blockchain wallet address and a verification blockchain wallet address.

Next, the process proceeds to Step S38, and the back-end 42 transmits blockchain wallet ownership authentication to the consumer 41. When the consumer 41 wants the ownership authentication of the appraisal required product, it can be achieved by thus reading ownership authentication data (the blockchain wallet ownership authentication) recorded on the smart contract (the blockchain 8*a*).

Therefore, instead of the above-described analog goods appraisal and authentication, the hybrid appraisal and authentication can be performed by thus reading the ownership authentication data (the blockchain wallet ownership authentication) recorded on the blockchain 8*a* and based on the transaction hash or the two-dimensional code issued from the dedicated platform 8 as illustrated in FIG. 9A.

In addition, when the blockchain wallet ownership authentication as described above is used, as illustrated in FIG. 9B, the analog goods appraisal and authentication may be further combined. In this case, the secret key $\alpha_1$ assigned to the appraisal required product 5 and the secret key $\beta_1$ assigned to the guarantee card 24 in the analog goods appraisal and authentication may be used, or the secret key $\alpha_1$ or the secret key $\beta_1$ may be used. The hybrid appraisal and authentication can be performed based on the secret key $\alpha_1$ and/or the secret key $\beta_1$ in addition to the ownership authentication data (the blockchain wallet ownership authentication), and the transaction hash or the two-dimensional code.

According to the present invention, the appraisal and authentication with the NFT is not necessarily required, and as illustrated in FIG. 10, the appraisal and authentication with the identifier may be performed. Since the identifier itself is unique, the appraisal and authentication with it can be performed.

The consumer, or the manufacturing company, the manufacturer, the author, or the like acquires an identifier from the dedicated platform 8. At this time, when a two-dimensional code corresponding to the identifier is generated in addition to the identifier in Step S23, the consumer, or the manufacturing company, the manufacturer, the author, or the like may acquire the two-dimensional code.

Figure 10A:
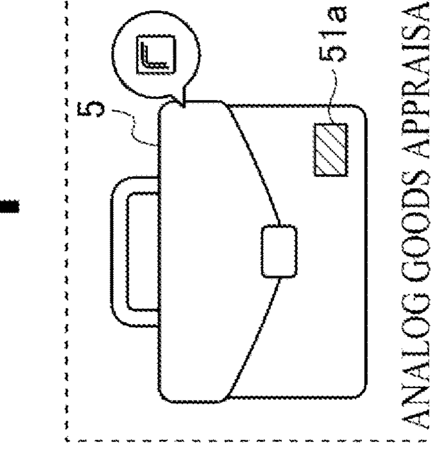
FIG. 10 is a diagram illustrating examples of performing a hybrid appraisal and authentication in which an identifier or the like and the analog goods appraisal and authentication are used together.
Figure 10B:
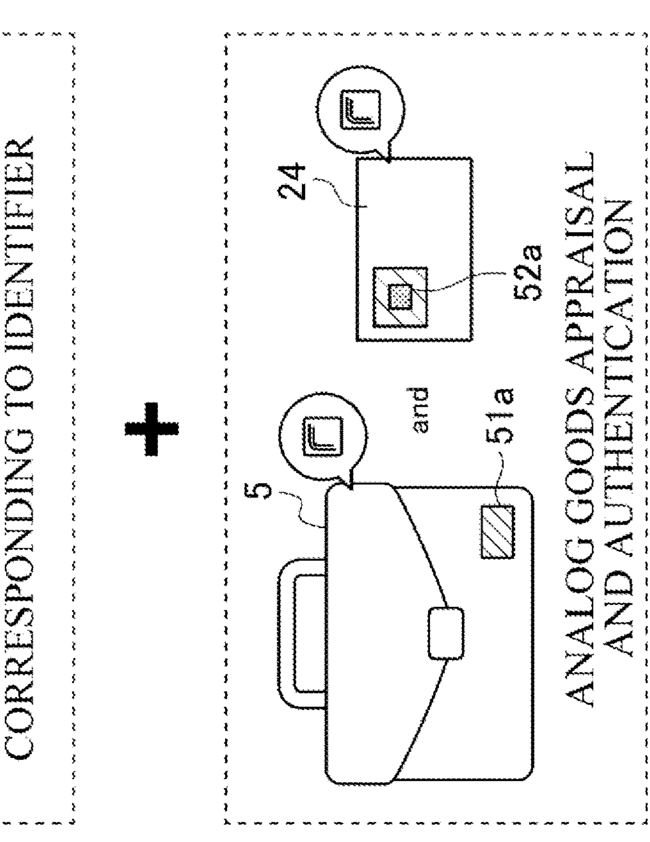

In the appraisal and authentication, in addition to the acquired identifier or the two-dimensional code corresponding to the identifier, the secret key $\alpha_1$ assigned to the appraisal required product 5 is prepared as illustrated in FIG. 10A, or the secret key $\alpha_1$ and the secret key $\beta_1$ assigned to the guarantee card 24 are prepared as illustrated in FIG. 10B.

Then, using the terminal 2, the product information and the transaction information of the appraisal required product 5 written on the blockchain 8*a* of the dedicated platform 8 is read with the secret key $\alpha_1$, or the secret key $\alpha_1$ and the secret key $\beta_1$. Together with this, the identifier or the two-dimensional code corresponding to the identifier is used to access the dedicated platform 8 or the distributed file server 3, thereby reading the identifier of the appraisal required product 5 recorded thereon. It can be determined that the appraisal required product 5 is a genuine product only when it is determined that the read product information and transaction information of the appraisal required product 5 and the identifier are all true.

In the example of FIG. 10, the hybrid appraisal and authentication in which the ownership authentication data (the blockchain wallet ownership authentication) is further combined may be performed.

Figure 11:
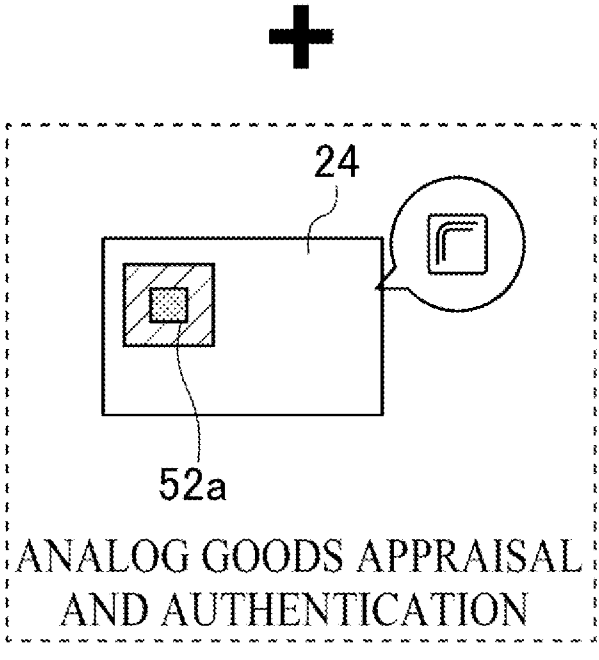
FIG. 11 is another diagram illustrating an example of performing a hybrid appraisal and authentication in which an identifier or the like and the analog goods appraisal and authentication are used together.

As far as the digital goods are concerned, as illustrated in FIG. 11, the hybrid appraisal and authentication using the secret key $\beta_1$ assigned to the guarantee card 24 in addition to the acquired identifier or the two-dimensional code corresponding to the identifier may be performed. Since the digital goods are not those in which the appraisal required products 5 are embodied as articles, and a small recording medium a itself cannot be attached to the digital goods, the secret key $\alpha_1$ is omitted, and only the secret key $\beta_1$ is used to perform the hybrid appraisal and authentication. In the example of FIG. 11, the hybrid appraisal and authentication in which the ownership authentication data (the blockchain wallet ownership authentication) is further combined may be performed.

Appraisal and Authentication by Counting Up

The present invention is not limited to the above-described embodiments, and may be performed by further including an appraisal and authentication by counting up.

In the appraisal and authentication by counting up, every time the above-described appraisal and authentication is performed, time points of the appraisal and authentication are sequentially recorded on the blockchain 8*a*. For example, when the appraisal and authentication is performed at 10:15 on August 19, the time point of 10:15, August 19 is recorded on the blockchain 8*a*, when the next appraisal and authentication is performed at 21:54 on September 23, the time point of 21:54, September 23 is recorded on the blockchain 8*a*, and when the next appraisal and authentication is performed at 13:34 on November 4, the time point of 13:34, November 4 is recorded on the blockchain 8*a*. As a result, the time points at which the appraisal and authentication is recorded are sequentially accumulated on the blockchain 8*a*.

The appraisal and authentication by counting up performs the appraisal and authentication based on the time points recorded on the blockchain 8*a*. For example, when a plurality of times of the appraisal and authentication are recorded on the blockchain 8*a* at the same time point, it is apparent that any one of the appraisal required products 5 is a genuine product and the other is a fake product. In this case, the fact may be notified.

When the time difference of the time points of the appraisal and authentication is tens of seconds, several minutes to tens of minutes, or several hours, it is doubtful in some cases because it is rare to frequently appraise the same article. Also in this case, the fact may be notified as well.

Thus, the credibility is determined based on the time points of the appraisal and authentication sequentially recorded on the blockchain 8*a*. At this time, a threshold may be provided for an interval of the time points recorded on the blockchain 8*a*, and the appraisal and authentication may be performed based on whether it is less than the threshold or not.

In addition to the time point of the appraisal and authentication, location information on a location at which the appraisal and authentication is performed may be further associated and recorded on the blockchain 8*a*. For example, in addition to the time point of 10:15, August 19, when the location at which the appraisal and authentication is performed is "Marunouchi, Tokyo," the time point of 10:15, August 19 and "Marunouchi, Tokyo" as the location information are recorded on the blockchain 8*a*. In addition to the time point of 14:09, December 21 as the time point at which the next appraisal and authentication is performed, when the location at which the appraisal and authentication is performed is "address AB in Paris," the time point of 14:09, December 21 and "address AB in Paris" as the location information are recorded on the blockchain 8*a*. As a result, the respective time points at which the appraisal and authentication is recorded and the location information thereof are sequentially accumulated on the blockchain 8*a*.

At this time, on the blockchain 8*a*, when the location information at the time point of the first appraisal and authentication is Tokyo, and the location information at the time point of the appraisal and authentication thereafter is recorded as Paris, and when the interval between the time points is only two hours, since it is impossible to move from Tokyo to Paris in two hours even by airplane, it is apparent that any one of the appraisal required products 5 is a genuine product and the other is a fake product. In this case, the fact may be notified. Specifically, a fact of fraud detection may be notified to a registered e-mail address, an alert pop-up may be indicated via an application installed in the terminal 2, or a method of displaying a call for attention in red on a screen may be performed.

Thus, the credibility is determined based on the time points and the location information of the appraisal and authentication sequentially recorded on the blockchain 8*a*. At this time, when the determination is made with a threshold provided for an interval of the time points recorded on the blockchain 8*a*, the threshold may be set in relation with the location information.

In addition to the determination of the credibility based on whether the appraisal and authentication is performed in a distance not allowing the move within a predetermined time or not, the determination of the credibility may be performed, regardless of the location information, based on whether the appraisal and authentication is performed equal to or more than a predetermined number of times a day or not, or based on whether the total number of times of the appraisal and authentication exceeds a predetermined number of times or not. That is, based on the number of times of the appraisal and authentication for a predetermined period, the credibility is determined. Based on whether the number of times of the appraisal and authentication for the predetermined period exceeds the threshold or not, the credibility is determined. When the number of times of the appraisal and authentication for the predetermined period exceeds the threshold, since it is unusual that the appraisal and authentication is performed many times for such a short period, it is determined that the credibility is doubtful, and an alert may be notified.

In a case where the appraisal required product 5 is a cosmetic product or the like, when an opening detection seal with an IC chip is attached, the opening detection seal with an IC chip is broken simultaneously with use. Therefore, the appraisal and authentication cannot be performed multiple times, and if the appraisal and authentication is performed multiple times, it is confirmed that a fake product is apparently distributed. In this case, it can be said that the merit of determining the credibility based on the number of times of the appraisal and authentication for the predetermined period is provided.

Table 1 illustrates an example of the time point and the location information of the appraisal and authentication sequentially recorded on the blockchain 8*a*. The appraisal result display count indicates the number of times of the appraisal and authentication. The time point is indicated as a year, month, and day, and time. The location information is indicated by a country name, prefecture, and municipality level, but it is not limited thereto.

TABLE 1

| Appraisal Result Display Count | Year, Month, and Day | Time | Location Information |
|---|---|---|---|
| 1 | Nov. 1, 2021 | 15:10 | Japan: Tokyo, Chiyoda Ward |
| 2 | Nov. 5, 2021 | 11:09 | Japan: Tokyo, Minato Ward |
| 3 | Nov. 11, 2021 | 13:00 | Japan: Tokyo, Shibuya Ward |
| 4 | Nov. 11, 2021 | 13:00 | China: Beijing, Chaoyang District |

Incidentally, acquiring the location information is implemented in, for example, the terminal 2 and/or the terminal 72 that is to perform the appraisal and authentication.

Current location information may be acquired via an application, or the information may be acquired with a format for tracing an IP address with which access has been gained.

Appraisal and Authentication Using Traceability

The following describes a method for an appraisal and authentication using traceability.

FIG. 12 illustrates a process of an appraisal and authentication method using traceability.

As a premise of starting the process, it is a premise that the above-described blockchain wallet address is assigned to each of the manufacturing company/manufacturer/author, the logistics company, and the consumer in advance. The blockchain wallet address may be assigned by an operator side of the system. To the manufacturing company/manufacturer/author, the logistics company, and the consumer to which the blockchain wallet addresses are assigned, respective secret keys associated with the assigned blockchain wallet addresses may be distributed. Each entity of the manufacturing company, the manufacturer, the author, the logistics company, and the consumer may acquire the blockchain wallet address by oneself.

First, in Step S41, digital goods data on the appraisal required product 5 is acquired. The digital goods data is acquired from an object of the appraisal and authentication. Similarly to the above, for the digital goods data, in addition to the digital goods data obtained by taking an image with the terminal 2 by the manufacturing company, the manufacturer, the author, or the like, one originally assigned to or associated with the appraisal required product 5 and recorded on a storage medium may be used. The digital goods data is any digital content that needs to be appraised and authenticated, such as a digital image, a digital sound, digital music, and a digital video, and as an extension, for example, jpg, png, gif, mp3, or mov is assigned. At this time, together with the digital goods data, the above-described additional information and every piece of product information regarding the appraisal required product may be acquired. In this case, a csv format file to which the digital goods data, the register number, the additional information, the product information, and the like are written may be acquired.

Next, the process proceeds to Step S42, by registering the digital goods data, the additional information, the product information, and the like on the dedicated platform 8, similarly to the above, an NFT is issued from the blockchain 8*a* that this dedicated platform 8 refers to, and a transaction hash and a two-dimensional code corresponding to the NFT are automatically generated. This transaction hash may be embodied by data, such as an ID (also referred to as an TxID), and may be embodied as a blockchain address.

Then, a first hash obtained by further hashing based on the transaction hash is additionally generated. Other than the generation of the first hash based on the transaction hash, the transaction hash itself may be directly used as the first hash.

While it goes without saying that the issued NFT is associated with the transaction hash, the NFT is also associated with the first hash generated from the transaction hash. The NFT is recorded on the blockchain 8*a*.

Next, the process proceeds to Step S43, and similarly to the above-described analog goods appraisal and authentication, information including the secret key $\alpha_1$, the product information, and the transaction information recorded on the small recording medium ($a_1$) 51*a* of the appraisal required product 5 and/or information including the secret key $\beta_1$, the product information, and the transaction information recorded on the small recording medium (b) 52*a* of the guarantee card 24 are read. Then, a second hash generated in writing the read information to the blockchain 8*a* is acquired.

The guarantee card 24 includes a logical guarantee card as digital information without being embodied as an article in addition to a physical guarantee card actually embodied as a card-shaped article.

Next, the process proceeds to Step S44, and a third hash is additionally generated based on the acquired first hash and second hash. As a generation method of the third hash, a product or a sum of the first hash and the second hash is obtained, and the product or the sum may be used as the third hash, or the third hash may be obtained by any other well-known method. The obtained third hash is recorded on the blockchain 8*a*. At this time, the third hash may be recorded by associating with the above-described NFT, and the transaction hash and the two-dimensional code corresponding to the NFT.

The above-described preprocessing of Step S41 to Step S44 may be performed by the operator side in advance, or may be performed by the other relating entity (the manufacturing company, the manufacturer, the author, the logistics company, the consumer, or the like) by itself in advance. The subsequent processes in the distribution of the appraisal required product 5 from the manufacturing company/manufacturer/author to the logistics company and the consumer are Step S45 and after described below.

In the present invention, while the blockchain wallet address may be assigned by what is called centralized Web2.0, it is not limited thereto. For example, the blockchain wallet address may be embodied with Web3.0 in which individual digital assets are all stored in a blockchain wallet without inputting personal information (gender, nationality, race, age, and the like) and no one can delete them. That is, what is called a decentralized type not depending on centralization may be applied to Web3.0.

In Step S45, first, the appraisal required product 5 produced by the manufacturing company/manufacturer/author is transferred to a logistics company. That is, in Step S45, an owner of the appraisal required product 5 is changed from the manufacturing company/manufacturer/author to the logistics company. At this time, the small recording medium ($a_1$) and the small recording medium (b) attached to the appraisal required product 5 are transferred as well. An owner of the NFT of the appraisal required product 5 changes as well.

For each transfer, the blockchain wallet address of the owner at the transfer destination is recorded in association with the NFT. While the blockchain wallet address of the manufacturing company/manufacturer/author is recorded in association with the NFT before the transfer, a blockchain wallet address of the logistics company is additionally recorded in association with the NFT at the time of the transfer. In this case, the various business operators and the like may write the blockchain wallet address at the time of the transfer to the blockchain data 8*b* of the dedicated platform 8 using the application [A] or the like.

In this Step S45, the logistics company receives the transaction hash or the two-dimensional code together with the appraisal required product 5 from the various business operators and the like or a marketplace constituting the dedicated platform 8. The logistics company that has received the transaction hash or the two-dimensional code can access the blockchain 8*a* of the dedicated platform 8 using the transaction hash or the two-dimensional code, and can read the NFT of the appraisal required product 5 recorded thereon.

The process proceeds to Step S46, and the appraisal required product 5 is transferred from the logistics company to the consumer. At this time, the small recording medium ($a_1$) and the small recording medium (b) attached to the appraisal required product 5 are transferred as well. An owner of the NFT of the appraisal required product 5 changes as well.

Since the blockchain wallet address of the owner at the transfer destination is recorded in association with the NFT for each transfer, a blockchain wallet address of the consumer is additionally recorded in association with the NFT.

In this Step S46, the consumer receives the transaction hash or the two-dimensional code together with the appraisal required product 5 from the various business operators and the like or a marketplace constituting the dedicated platform 8. The consumer who has received the transaction hash or the two-dimensional code can access the blockchain 8*a* of the dedicated platform 8 using the transaction hash or the two-dimensional code, and can read the NFT of the appraisal required product 5 recorded thereon.

Such a consumer can attempt the appraisal and authentication of the appraisal required product 5 via the dedicated platform 8. Hereinafter, the consumer who attempts the appraisal and authentication is referred to as an appraisal authenticating person.

In Step S47, first, the appraisal authenticating person accesses the dedicated platform 8, eventually the blockchain 8*a*, thereby performing a write operation to a log. The write operation to the log can be achieved from a user interface of an application, and for example, personal information including a name, a birth date, and the like of the appraisal authenticating person and any other piece of information are written according to the guide of the user interface. Even when the guide of the user interface is not provided, any piece of information input from the appraisal authenticating person or any character string with no informational meaning may be considered the write operation to the log.

In this case, at the time of the assignment of the blockchain wallet address, when a secret key is assigned to the appraisal authenticating person, the appraisal authenticating person may access the log via the secret key. Needless to say, the appraisal authenticating person may generate a blockchain address by oneself, and use it. When the signature is given with the secret key, the blockchain wallet address can be automatically acquired on the blockchain 8*a*. Alternatively, the secret key may be input on the user interface, and the presence or absence of the blockchain wallet address assigned to the secret key may be verified in the dedicated platform 8 side. As a result, when the blockchain wallet address is assigned to the secret key, the signature is given thereto in the dedicated platform 8 side. It is determined that the case where the signature is given is success in writing to the log, and it is determined that the other cases are fail in writing to the log. The signature may be automatically performed by a program.

For writing to the log, the signature with the secret key is always required. When the signature is given, the blockchain wallet address can be automatically acquired on the blockchain 8*a*. Therefore, by encouraging the appraisal authenticating person to perform writing to the log on the user interface, the blockchain wallet address can be acquired. Specifically, a public key can be acquired via the secret key, and the blockchain wallet address can be acquired via the public key.

The dedicated platform 8 can determine a fact of being an owner of the blockchain wallet address. Meanwhile, in a case of failure in writing to the log, a fact of not being the owner of the blockchain wallet address can be determined. When the fact of being the owner of the blockchain wallet address is determined, the determined blockchain wallet address (hereinafter referred to as a second blockchain wallet address) is read.

The method of acquiring the second blockchain wallet address is not limited to the above-described method, and the second blockchain wallet address may be acquired by any other method. In the acquisition of the second blockchain wallet address, the acquisition may be performed by a direct input from the appraisal authenticating person.

In this Step S47, the blockchain wallet address associated with the NFT corresponding to the transaction hash obtained from the appraisal authenticating person or the two-dimensional code corresponding thereto is read from the blockchain 8*a*. The blockchain wallet address read from the blockchain 8*a* is hereinafter referred to as a first blockchain wallet address.

Next, an identity between the first blockchain wallet address and the second blockchain wallet address is determined. When the first blockchain wallet address is identical to the second blockchain wallet address, the check ends. It can be determined that the appraisal required product 5 is not an imitation but a genuine product by the end of the check. Meanwhile, when the first blockchain wallet address is not identical to the second blockchain wallet address, it can be determined that the appraisal authenticating person is not the owner of the appraisal required product 5.

The reason is as follows. The first blockchain wallet address recorded in association with the NFT every time the owner of the NFT changes serves as a proof of the genuine product. The owner of the second blockchain wallet address identical to the first blockchain wallet address is a proof of a fact of owning the appraisal required product 5 as the genuine product at the current time point. Accordingly, the determination of the identity between the first blockchain wallet address and the second blockchain wallet address allows the appraisal and authentication of the appraisal required product 5.

In addition, the determination may be performed in further combination with an appraisal and authentication described in Step S48.

In Step S48, a fourth hash is generated based on a transaction hash associated with the NFT corresponding to the transaction hash acquired from the appraisal authenticating person or the two-dimensional code corresponding thereto. The generation method of the fourth hash is similar to the above-described generation method of the first hash.

Additionally, in Step S48, the information including the secret key $\alpha_1$, the product information, and the transaction information recorded on the small recording medium ($a_1$) 51*a* of the appraisal required product 5 and/or the information including the secret key $\beta_1$, the product information, and the transaction information recorded on the small recording medium (b) 52*a* of the guarantee card 24 are read. Then, a fifth hash generated in writing the read information to the blockchain 8*a* is acquired.

Next, based on the obtained fourth hash and fifth hash, a sixth hash is additionally generated. The generation method of the sixth hash is similar to the above-described generation method of the third hash.

An identity between the sixth hash obtained as described above and the third hash is determined.

When the appraisal required product 5 is the genuine product, the fifth hash generated in the writing of the information read from the small recording medium ($a_1$) 51*a* and the small recording medium (b) 52*a* to the blockchain 8*a* is identical to the second hash. Additionally, when the appraisal authenticating person owns the genuine product, the fourth hash generated based on the transaction hash associated with the transaction hash or the two-dimensional code received from the marketplace constituting the dedicated platform 8 is identical to the first hash.

Therefore, depending on whether the sixth hash generated based on the fourth hash and the fifth hash is identical to the third hash or not, similarly, whether the appraisal required product 5 is the genuine product or not can be determined. Specifically, after generating the sixth hash, whether the third hash identical to it is stored on the blockchain 8*a* or not is searched. Thus, by the determination with not only the first hash and the second hash but also the third hash generated based on them, the secrecy can be more improved. In addition, in the writing to the blockchain 8*a*, instead of writing the two of the first hash and the second hash, it is only necessary to write only one third hash reflecting them, and therefore, the writing speed can be improved, and the speed of the processing operation can be increased.

Then, in the present invention, the appraisal and authentication of the appraisal required product 5 may be performed by determining both of the identity between the first blockchain wallet address and the second blockchain wallet address and the identity between the third hash and the sixth hash. That is, when the first blockchain wallet address is identical to the second blockchain wallet address, and the third hash is identical to the sixth hash, the check ends. The fact that the appraisal required product 5 is the genuine product is determined by the end of the check. Meanwhile, when any one or both of the first blockchain wallet address and the second blockchain wallet address, and the third hash and the sixth hash are not identical, it can be determined that the appraisal authenticating person is not the owner of the appraisal required product 5.

Thus, in the present invention, the appraisal and authentication can be performed based on completely different methods of the identity between the first blockchain wallet address and the second blockchain wallet address and the identity between the third hash and the sixth hash. Therefore, even when it is determined that the appraisal required products 5 is the genuine product by successfully passing through the appraisal and authentication by any one of the methods, it is not determined that the appraisal required product 5 is the genuine product when it is determined that the appraisal required products 5 is a counterfeit product by the appraisal and authentication of the other method. Accordingly, among the appraisal required products 5, for the articles to which the appraisal and authentication is more strongly performed, the appraisal and authentication can be achieved with higher accuracy.

DESCRIPTION OF REFERENCE SIGNS

1: Product appraisal and authentication system
2, 72: Terminal
3: Distributed file server
5: Appraisal required product
8: Dedicated platform
8*a*: Blockchain
8*b*: Blockchain data
10: Public communications network
24: Guarantee card
25: Reader
43: Blockchain wallet

The invention claimed is:

1. A product appraisal and authentication system comprising:

a first terminal that individually assigns a hashed identifier to an appraisal required product based on digital goods data of the appraisal required product;

a second terminal;

a distributed file server that generates the hashed identifier individually assigned to the appraisal required product;

a dedicated platform comprising a processor that outputs a transaction hash or a two-dimensional code corresponding thereto generated when a non-fungible token (NFT) of the appraisal required product associated with the identifier generated in the distributed file server is recorded on a blockchain of the dedicated platform; and the processor records a first blockchain wallet address of an owner of the NFT of the appraisal required product at a transfer destination in association with the NFT every time the owner changes, wherein an appraisal and authentication of the appraisal required product is performed by the processor by directly acquiring a second blockchain wallet address from an appraisal authenticating person, reading a first blockchain wallet address associated with an NFT that corresponds to a transaction hash or a two-dimensional code corresponding thereto acquired from the appraisal authenticating person, and determining whether the read first blockchain wallet address and the second blockchain wallet address are identical to each other, thereby authenticating the appraisal required product, wherein the appraisal and authentication is further performed by the processor using the appraisal required product, and the transaction hash or the two-dimensional code output from the dedicated platform, and a small recording medium ($a_1$) that stores a secret key $\alpha_1$ and product information with regard to the appraisal required product, the small recording medium ($a_1$) being attached to or incorporated in the appraisal required product, the processor records on a blockchain the product information and transaction information at respective distribution stages until the appraisal required product reaches a consumer, the product appraisal and authentication system further includes:

an application [A] which is a software program executed by a controller in the second terminal comprising the application [A] used for writing the product information and the transaction information to the blockchain by a manufacturing company, a manufacturer, an author, and various business operators; and an application [B] which is a software program executed by a controller in the first terminal comprising the application [B] used for reading the product information and the transaction information from the blockchain by the consumer, the processor of the dedicated platform further performs the appraisal and authentication by additionally generating a third hash based on a first hash and a second hash, and recording the third hash on the blockchain, the first hash is generated by the processor based on the transaction hash, and the second hash is obtained by the processor when the manufacturing company, the manufacturer, the author, and the various business operators write the product information and/or the transaction information to the blockchain using the application [A], and the appraisal and authentication of the appraisal required product is performed by the processor by additionally generating a sixth hash based on a fourth hash and a fifth hash, and determining both of whether the first blockchain wallet address and the second blockchain wallet address are identical to each other and whether the third hash and the sixth hash are identical to each other, the fourth hash is generated by the processor based on the transaction hash or the two-dimensional code corresponding thereto acquired from the appraisal authenticating person, and the fifth hash is read from the blockchain by the processor based on the product information and the transaction information with the secret key $\alpha_1$ assigned to the appraisal required product using the application [B] by the appraisal authenticating person.

2. A product appraisal and authentication system comprising:

a first terminal that individually assigns a hashed identifier to an appraisal required product based on digital goods data of the appraisal required product;

a second terminal;

a distributed file server that generates the hashed identifier individually assigned to the appraisal required product;

a dedicated platform comprising a processor that outputs a transaction hash or a two-dimensional code corresponding thereto generated when a non-fungible token (NFT) of the appraisal required product associated with the identifier generated in the distributed file server is recorded on a blockchain of the dedicated platform; and the processor records a first blockchain wallet address of an owner of the NFT of the appraisal required product at a transfer destination in association with the NFT every time the owner changes, wherein an appraisal and authentication of the appraisal required product is performed by the processor by directly acquiring a second blockchain wallet address from an appraisal authenticating person, reading a first blockchain wallet address associated with an NFT that corresponds to a transaction hash or a two-dimensional code corresponding thereto acquired from the appraisal authenticating person, and determining whether the read first blockchain wallet address and the second blockchain wallet address are identical to each other, thereby authenticating the appraisal required product, wherein the appraisal and authentication is further performed by the processor using the appraisal required product, and the transaction hash or the two-dimensional code output from the dedicated platform, and a small recording medium ($a_1$) that stores a secret key $\alpha_1$ and product information with regard to the appraisal required product, the small recording medium ($a_1$) being attached to or incorporated in the appraisal required product, the processor records on a blockchain the product information and transaction information at respective distribution stages until the appraisal required product reaches a consumer, the product appraisal and authentication system further includes:

an application [A] which is a software program executed by a controller in the second terminal comprising the application [A] used for writing the product information and the transaction information to the blockchain by a manufacturing company, a manufacturer, an author, and various business operators; and an application [B] which is a software program executed by a controller in the first terminal comprising the application [B] used for reading the product information and the transaction information from the blockchain by the consumer, the processor of the dedicated platform further performs the appraisal and authentication by additionally generating a third hash based on a first hash and a second hash, and recording the third hash on the blockchain, the first hash is generated by the processor based on the transaction hash, and the second hash is obtained by the processor when the manufacturing company, the manufacturer, the author, and the various business operators write the product information and/or the transaction information to the blockchain using the application [A], and the appraisal and authentication of the appraisal required product is performed by the processor by additionally generating a sixth hash based on a fourth hash and a fifth hash, and determining both of whether the first blockchain wallet address and the second blockchain wallet address are identical to each other and whether the third hash and the sixth hash are identical to each other, the fourth hash is generated by the processor based on the transaction hash or the two-dimensional code corresponding thereto acquired from the appraisal authenticating person, and the fifth hash is read from the blockchain by the processor based on the product information and the transaction information with the secret key $\alpha_1$ assigned to the appraisal required product using the application [B] by the appraisal authenticating person, wherein the appraisal and authentication is further performed by the processor using a guarantee card, and the transaction hash or the two-dimensional code output from the dedicated platform and generated by the processor, and a small recording medium (b) that records a secret key $\beta$1 and product information on an appraisal required product is attached to or incorporated in the guarantee card, the product information and transaction information at respective distribution stages until the appraisal required product reaches a consumer are recorded by the processor on a blockchain, the appraisal and authentication of the appraisal required product is further performed by the processor by reading the fifth hash from the blockchain based on the product information and the transaction information with the secret key $\beta_1$ assigned to the guarantee card using the application [B] by the appraisal authenticating person.

3. A product appraisal and authentication system comprising:

a first terminal that individually assigns a hashed identifier to an appraisal required product based on digital goods data of the appraisal required product;

a second terminal;

a distributed file server that generates the hashed identifier individually assigned to the appraisal required product;

a dedicated platform comprising a processor that outputs a transaction hash or a two-dimensional code corresponding thereto generated when a non-fungible token (NFT) of the appraisal required product associated with the identifier generated in the distributed file server is recorded on a blockchain of the dedicated platform; and the processor records a first blockchain wallet address of an owner of the NFT of the appraisal required product at a transfer destination in association with the NFT every time the owner changes, wherein an appraisal and authentication of the appraisal required product is performed by the processor by directly acquiring a second blockchain wallet address from an appraisal authenticating person, reading a first blockchain wallet address associated with an NFT that corresponds to a transaction hash or a two-dimensional code corresponding thereto acquired from the appraisal authenticating person, and determining whether the read first blockchain wallet address and the second blockchain wallet address are identical to each other, thereby authenticating the appraisal required product, wherein the appraisal and authentication is further performed by the processor using the appraisal required product, and the transaction hash or the two-dimensional code output from the dedicated platform, and a small recording medium ($a_1$) that stores a secret key $\alpha_1$ and product information with regard to the appraisal required product, the small recording medium ($a_1$) being attached to or incorporated in the appraisal required product, the processor records on a blockchain the product information and transaction information at respective distribution stages until the appraisal required product reaches a consumer, the product appraisal and authentication system further includes:

an application [A] which is a software program executed by a controller in the second terminal comprising the application [A] used for writing the product information and the transaction information to the blockchain by a manufacturing company, a manufacturer, an author, and various business operators; and an application [B] which is a software program executed by a controller in the first terminal comprising the application [B] used for reading the product information and the transaction information from the blockchain by the consumer, the processor of the dedicated platform further performs the appraisal and authentication by additionally generating a third hash based on a first hash and a second hash, and recording the third hash on the blockchain, the first hash is generated by the processor based on the transaction hash, and the second hash is obtained by the processor when the manufacturing company, the manufacturer, the author, and the various business operators write the product information and/or the transaction information to the blockchain using the application [A], and the appraisal and authentication of the appraisal required product is performed by the processor by additionally generating a sixth hash based on a fourth hash and a fifth hash, and determining both of whether the first blockchain wallet address and the second blockchain wallet address are identical to each other and whether the third hash and the sixth hash are identical to each other, the fourth hash is generated by the processor based on the transaction hash or the two-dimensional code corresponding thereto acquired from the appraisal authenticating person, and the fifth hash is read from the blockchain by the processor based on the product information and the transaction information with the secret key $\alpha_1$ assigned to the appraisal required product using the application [B] by the appraisal authenticating person, wherein in the dedicated platform, the transaction hash is directly used as the first hash, and the transaction hash acquired from the appraisal authenticating person in the appraisal and authentication is directly used as the fourth hash.

* * * * *